(12) United States Patent (10) Patent No.: US 9,425,861 B2
Song (45) Date of Patent: Aug. 23, 2016

(54) ELECTRONIC DEVICE AND OPERATING METHOD THEREOF

(75) Inventor: Wongyu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/233,355

(22) PCT Filed: Jul. 20, 2012

(86) PCT No.: PCT/KR2012/005804
§ 371 (c)(1),
(2), (4) Date: Jan. 16, 2014

(87) PCT Pub. No.: WO2013/015571
PCT Pub. Date: Jan. 31, 2013

(65) Prior Publication Data
US 2014/0148098 A1 May 29, 2014

Related U.S. Application Data

(60) Provisional application No. 61/511,134, filed on Jul. 25, 2011, provisional application No. 61/598,912, filed on Feb. 15, 2012, provisional application No. 61/611,586, filed on Mar. 16, 2012.

(51) Int. Cl.
*H04B 5/00* (2006.01)
*H04W 76/04* (2009.01)
*H04W 76/02* (2009.01)
*H04W 36/14* (2009.01)
*H04W 48/16* (2009.01)
*H04W 8/00* (2009.01)

(52) U.S. Cl.
CPC ................. *H04B 5/00* (2013.01); *H04W 36/14* (2013.01); *H04W 76/023* (2013.01); *H04W 8/005* (2013.01); *H04W 48/16* (2013.01)

(58) Field of Classification Search
CPC ......... H04B 5/00; H04W 76/04; H04W 4/008
See application file for complete search history.

(56) References Cited

U.S. PATENT DOCUMENTS

| 8,244,917 | B2 * | 8/2012 | Takayama et al. ................. 710/1 |
| 2009/0111378 | A1 * | 4/2009 | Sheynman et al. ........... 455/41.1 |
| 2009/0222659 | A1 | 9/2009 | Miyabayashi et al. |
| 2009/0257403 | A1 * | 10/2009 | Jeon ...................... H04W 36/12 370/331 |
| 2010/0009711 | A1 * | 1/2010 | Takada ................... H04W 12/06 455/525 |
| 2010/0178920 | A1 * | 7/2010 | Kitazoe ............. H04W 36/0055 455/436 |
| 2011/0128901 | A1 * | 6/2011 | Lee et al. ....................... 370/311 |
| 2011/0177780 | A1 * | 7/2011 | Sato ...................... H04W 36/14 455/41.1 |

(Continued)

FOREIGN PATENT DOCUMENTS

| EP | 2445257 A1 | 4/2012 |
| JP | 200797022 A | 4/2007 |

(Continued)

OTHER PUBLICATIONS

NFC Forum Connection Handover Jul. 7, 2010.*
NFC Forum, "Connection Handover", Technical Specification, Jul. 7, 2010.

*Primary Examiner* — Cindy Trandai
(74) *Attorney, Agent, or Firm* — Dentons US LLP

(57) ABSTRACT

The present invention pertains to an electronic device and an operating method thereof, in which a handover relay device transmits connection information on two or more electronic devices to the other party, thereby effectively establishing connection between the electronic devices.

10 Claims, 28 Drawing Sheets

(56) References Cited

U.S. PATENT DOCUMENTS

2011/0292300 A1* 12/2011 Nagara et al. .................. 348/734
2012/0100803 A1* 4/2012 Suumaki et al. ............. 455/41.1
2012/0265913 A1* 10/2012 Suumaki ............... H04W 4/008
　　　　　　　　　　　　　　　　　　　　　710/303
2013/0102250 A1* 4/2013 Mutikainen ......... H04W 76/043
　　　　　　　　　　　　　　　　　　　　　455/41.2

FOREIGN PATENT DOCUMENTS

| JP | 2009212732 A | 9/2009 |
|---|---|---|
| KR | 1020080022590 | 3/2008 |
| KR | 1020110040025 | 4/2010 |
| KR | 1020100075580 | 7/2010 |
| WO | 2005094108 A1 | 10/2005 |
| WO | 2011/087210 A2 | 7/2011 |

* cited by examiner

ELECTRONIC DEVICE AND OPERATING METHOD THEREOF

This application is a 35 USC §371 National Stage entry of International Application No. PCT/KR2012/005804 filed on Jul. 20, 2012, and claims priority of U.S. Provisional Application Nos. 61/511,134 filed on Jul. 25, 2011, 61/598,912 filed on Feb. 15, 2012 and 61/611,586 filed on Mar. 16, 2012, which are hereby incorporated by reference in its entirety.

TECHNICAL FIELD

The present invention concerns methods for making a connection between electronic devices. More specifically, the present invention relates to methods of using a near field communication means for making a connection between electronic devices.

BACKGROUND ART

Near field communication (hereinafter, "NFC") is a very short-range contactless data transfer technology related to RFID (radio frequency data identification) and may be preferably used for communication between devices that are positioned apart from each other within 10 cm or less (preferably 4 cm or less).

NFC uses a center frequency of 13.56 MHz and may offer transmission speeds such as 106, 212, and 424 kbps. NFC may provide compatibility with various contactless communication protocols. For example, NFC may be compatible with protocols defined in ISO 14443 type A, B, F, and ISO 18092.

NFC may have various applications, such as, e.g., building a home network, smart poster, or bus ticketing.

When adopting an NFC technology, an electronic device may communicate with another electronic device also adopting the NFC technology, via at least one of a reader mode, card emulation mode, and peer-to-peer mode.

DETAILED DESCRIPTION OF INVENTION

Objects

An object of the present invention is to provide a method for making a connection between two or more electronic devices using a near-field communication link.

The present invention is not limited to the above object, and other objects will be apparent to one of ordinary skill in the art from the following detailed description.

Solutions

According to an aspect of the present invention, a method for mediating a communication link by a first electronic device may comprise transmitting a first request message from the first electronic device to a second electronic device; receiving a first response message from the second electronic device in response to the first request message, the first response message including information related to a first alternative communication mean supported by the second electronic device; transmitting a second request message from the first electronic device to a third electronic device; receiving a second response message from the third electronic device in response to the second request message, the second response message including information related to a second alternative communication mean supported by the third electronic device; and requesting an establishment of the communication link for connecting the second electronic device and the third electronic device through an alternative communication mean, the alternative communication mean being selected based on the information related to the first alternative communication mean and the information related to the second alternative communication mean.

According to another aspect of the present invention, a method for mediating a communication link by a first electronic device may comprise receiving a message from a second electronic device, the message including information related to a first alternative communication mean supported by the second electronic device; transmitting a first request message from the first electronic device to a third electronic device; receiving a first response message from the third electronic device in response to the first request message, the first response message including information related to a second alternative communication mean supported by the third electronic device; and requesting an establishment of the communication link for connecting the second electronic device and the third electronic device through an alternative communication mean, the alternative communication mean being selected based on the information related to the first alternative communication mean and the information related to the second alternative communication mean.

Advantageous Effects

According to the present invention, two or more electronic devices may communicate with each other via an alternative communication means even when the electronic devices are positioned off an NFC communication range.

Further, according to the present invention, even when two or more electronic devices performing handover have low mobility, the electronic devices may easily form a connection therebetween by an alternative communication means, via an electronic device having high mobility.

DESCRIPTION OF EMBODIMENTS

Figure 1:
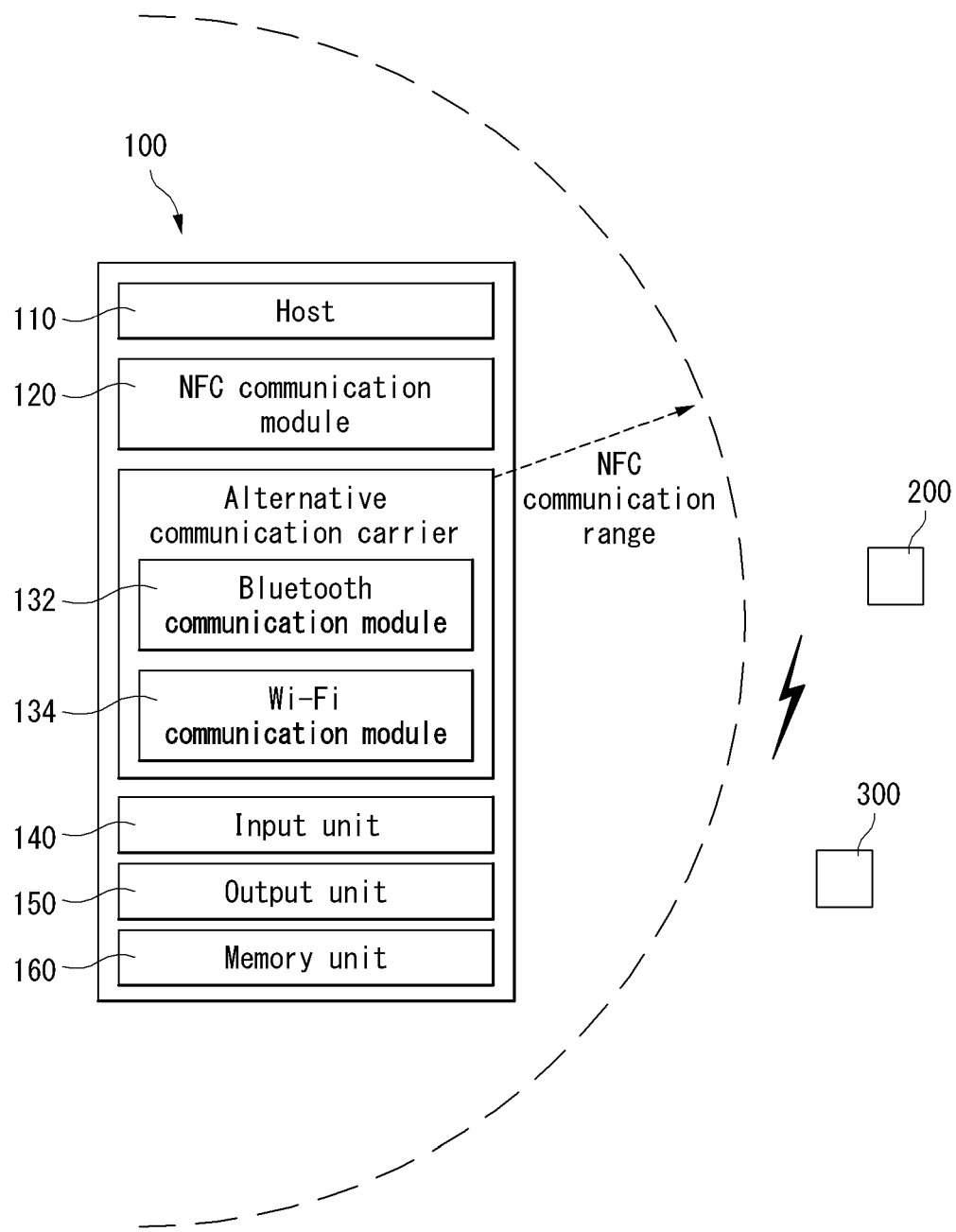
FIG. 1 is a block diagram illustrating an electronic device according to some embodiments of the present invention.

The foregoing objects, features, and advantages of the present invention will be more apparent from the following detailed description taken in conjunction with the accompanying drawings. However, various changes may be made to the present invention, and the present invention may have various embodiments. Hereinafter, specific embodiments of the present invention are shown in the drawings and are described with reference to the drawings. The same reference numerals are used to denote the same elements throughout the specification and the drawings.

When determined to make the subject matter of the present invention unnecessarily unclear, the detailed description of the known functions or configurations will be skipped. Further, as used herein, the terms "first" or "second" are merely used to distinguish one element from another.

Hereinafter, electronic devices according to the present invention are described in more detail with reference to the drawings. As used herein, the terms "module" and "unit" may be interchangeably used therebetween for ease of description, and do not mean they have distinct meanings or functions from each other.

FIG. 1 illustrates a system environment according to an embodiment of the present invention.

The system environment according to an embodiment of the present invention may include one or more NFC (near field communication) electronic devices that may form an NFC link.

Referring to FIG. 1, the system environment according to the present invention may include one or more electronic devices 100, 200, and 300. These are not essential components, and accordingly, more or less components may be included. As used herein, the electronic devices 100, 200, and 300 refer to any electronic devices that support NFC communication, and may include, e.g., various electronic devices that may support NFC communication, such as a mobile data processing device (e.g., a cellular phone, smartphone, or e-book reader), a printer, a TV, a DTV, a computer, a tablet computer, and an audio device. There are merely some examples of the electronic devices 100, 200, and 300, and more various types of devices may be included. Hereinafter, the electronic device may also be denoted an NFC electronic device.

The electronic device 100, as illustrated in FIG. 1, may include a host 110, an NFC communication module 120, one or more alternative communication means modules (alternative communication carriers).

The host 110 may function as a processor that controls the components in the electronic device 100. For example, the host 110 may output and/or receive various signals for controlling one or more alternative communication means, and the NFC communication module 120 illustrated in FIG. 1. Hereinafter, the host 110 may also be denoted a processor 110 or controller.

The NFC communication module 120 may form an NFC link with other electronic devices 200 and 300 that are supported by the electronic device 100 for NFC communication. The NFC communication module 120 may refer to an NFC forum device. As used herein, the NFC communication module may be denoted a near-field communication means.

The NFC communication module 120, as illustrated in FIG. 1, may form an NFC link through tagging with an NFC communication module of another electronic device.

The NFC communication module 120 may communicate with the NFC communication module of the other electronic device 200 or 300 in various modes. For example, the modes may include a card emulation mode, a reader mode, and a peer to peer mode.

In case the NFC communication module 120 operates in the card emulation mode, the NFC communication module 120 of the electronic device 100 may function as a card, i.e., a tag. In such case, the NFC communication module of the other electronic device may operate in a reader mode so that the NFC communication module of the other electronic device may obtain data from the NFC communication module 120 of the electronic device 100.

In case the NFC communication module 120 operates in the reader mode, the NFC communication module 120 of the electronic device 100 may function as a reader. In such case, the NFC communication module 120 of the electronic device 100 may obtain data from the NFC communication module of the other electronic device that operates in the emulation mode.

In case the NFC communication module 120 operates in the peer to peer mode, the NFC communication module 120 of the electronic device 100 may exchange data with the NFC communication module of the other electronic device.

The mode of the NFC communication module 120 may be determined according to a predetermined criterion. For example, the mode of the NFC communication module 120 may be set by a user's input or according to a predetermined algorithm.

The alternative communication means indicates a communication technology that may be used for data transmission between electronic devices, and the alternative communication means may include various communication modules, in addition to the NFC communication module. For example, the alternative communication means, as shown in FIG. 1, may include at least one of a Bluetooth (802.15.1 IEEE) communication module 132 and a Wi-Fi (Wireless Fidelity) communication module 134. In addition, the alternative communication means may include various communication means such as an RFID (radio frequency identification) communication module or a WiGig (Wireless Gigabit) communication module, and may include communication means that may be implemented in the future, as well as communication means currently implemented. Hereinafter, the alternative communication means may also be referred to as an alternative carrier or an alternative communication carrier.

The electronic device 100 may include an input unit 140 to receive a user's input. For example, the input unit 140 may be at least one of a keyboard, a mouse, and a touch screen.

Further, the electronic device 100 may include an output unit 150 to output information to a user. The output unit 150 may include at least one of a sound output unit for outputting a sound signal and a display unit for displaying images.

Further, the electronic device 100 may include a memory 160 for storing various data.

The electronic device 200 or 300 may include a component corresponding to the electronic device 100. In other words, the electronic device 200 or 300 may include a host, an NFC communication module, and an alternative communication means. Further, the electronic device 200 or 300 may further include at least one of the above described input unit 140, output unit 150, and memory 160. The internal structure of the electronic device 200 or 300 is shown in FIGS. 2 to 5.

For ease of description, as necessary, the electronic device 100 is referred to as first electronic device 100, the electronic device 200 as second electronic device 200, and the electronic device 300 as third electronic device 300.

The electronic device 100 may form an NFC link with another electronic device through the NFC communication module 120 and may then switch its communication module to the alternative communication means to thereby continue data communication with the other electronic device. As used herein, a series of process to, after a formation of the NFC link, enable the electronic device and the other electronic device to form a link with each other through the alternative communication means so that the electronic device and the other electronic device may continue to perform communication using the alternative communication means is referred to as handover.

In other words, the handover refers to the electronic device 100 and the other electronic device forming an NFC link and then performing data communication via the alternative communication means. A user may easily form an NFC link between the electronic device 100 and the other electronic device through NFC tagging and then may change its communication means to the alternative communication means that is more appropriate for remote and/or high-capacity data transmission than the NFC link.

Hereinafter, an embodiment of the present invention is described in further detail with reference to the accompanying drawings. For ease of description, the system environment illustrated in FIG. 1 is referenced. However, this is merely for the purpose of illustration, and the scope of the present invention is not limited to a specific environment or specific device.

Figure 2:
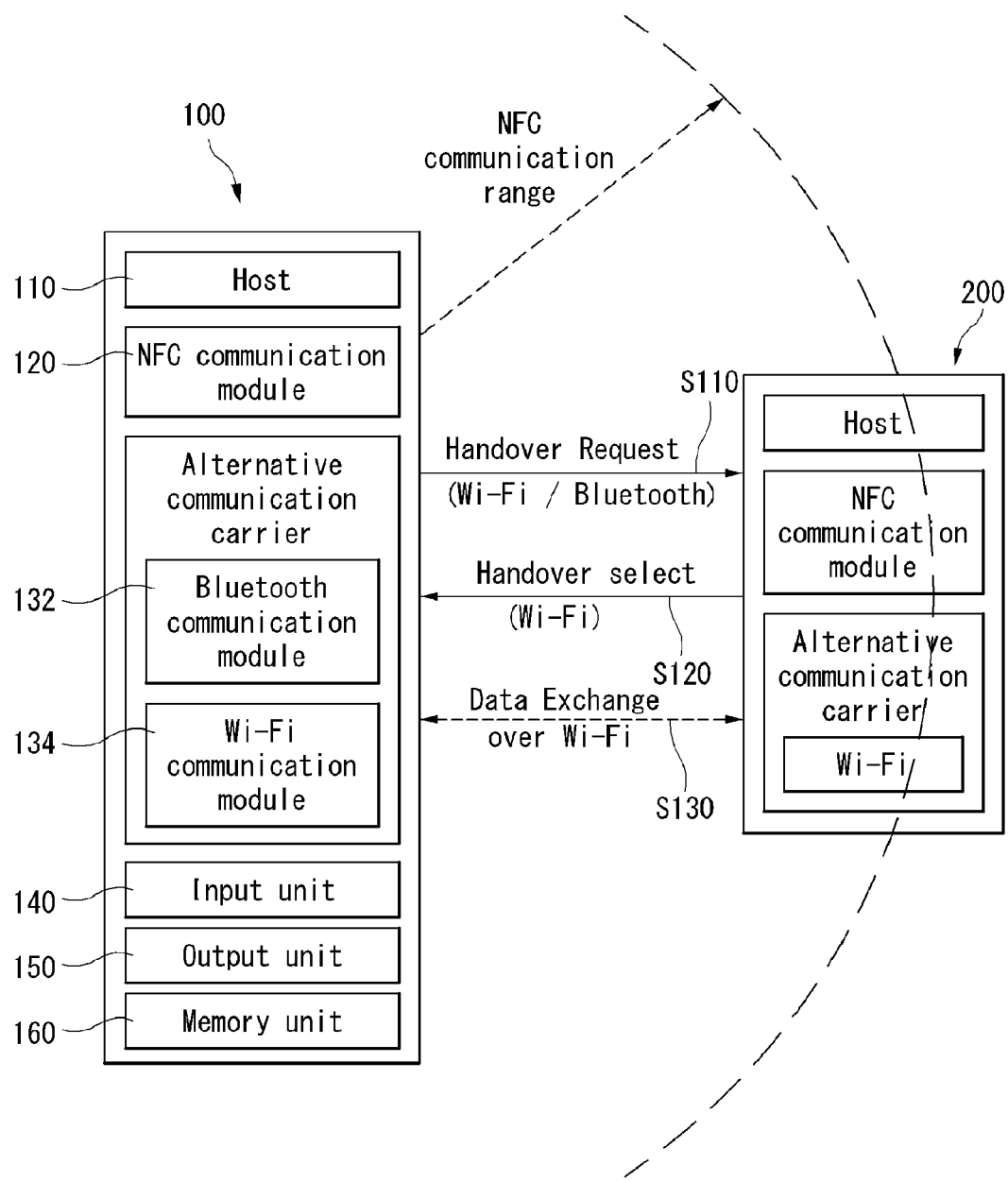
FIG. 2 is a view illustrating handover according to a first embodiment of the present invention.

FIG. 2 is a view illustrating handover according to a first embodiment of the present invention.

Referring to FIG. 2, the first electronic device 100 may transmit a handover request message to the second electronic device 200 (S100).

Prior to step S110, the first electronic device 100 and the second electronic device 200, which are positioned within an NFC communication range, may form an NFC link through tagging.

The first electronic device 100 may transmit a message for requesting handover, for example, a handover request message, to the second electronic device 200 through the NFC link, while the NFC link remains formed.

The first electronic device 100 transmits the handover request message to the second electronic device 200 so that the first electronic device 100 and the second electronic device 200 may initiate a protocol for changing the NFC link formed between the first electronic device 100 and the second electronic device 200 to another communication means.

The specific information included in the handover request message is to be described later.

Here, the first electronic device 100 may serve as a handover requester, and the second electronic device 200 may serve as a handover selector. The handover requester may refer to a device that initiates a handover protocol by transmitting the handover request message to another NFC electronic device, and the handover selector may refer to an NFC device that configures a handover select message in response to the received handover request message. That is, the handover requester (i.e., device requesting handover) and the handover selector (i.e., device selecting handover) are relative concepts that are determined depending on whether the device transmits a handover request message or handover select message. Accordingly, depending on circumstance, in case the second electronic device 200 transmits a handover request message to the first electronic device 100, the first electronic device 100 may be a handover selector, and the second electronic device 200 may be a handover requester.

The handover request message may include information related to alternative communication means supported by the first electronic device 100. For example, as shown in FIG. 1, since the first electronic device 100 supports Bluetooth and Wi-Fi, the handover request message may include information on Bluetooth and Wi-Fi that are supported by the first electronic device 100. The format of the specific data included in the handover request message is to be described later.

A plurality of alternative communication means may be assigned priorities. For example, as shown in FIG. 2, the handover request message may have information on an alternative communication means having a higher priority written earlier and information on an alternative communication means having a lower priority written later. Referring to the handover request message shown in FIG. 2, it may be seen that the Wi-Fi means that is an alternative communication means has a higher priority than the Bluetooth means. Or, a field that includes the priority of each communication means may be separately provided.

When receiving the handover request message, the second electronic device 200 may transmit a response to the handover request message to the first electronic device 100 (S120).

For example, the second electronic device 200 may generate a handover select message as an example of the response to the handover request message and may transmit the generated handover select message to the first electronic device 100.

The second electronic device 200 may determine an alternative communication means supported by the second electronic device 200 among the alternative communication means included in the handover request message, and according to the determination, may provide the first electronic device 100 with information on the alternative communication means supported by the second electronic device 200. That is, the alternative communication means included in the handover select message may include information on the alternative communication means supported by the second electronic device 200 among the alternative communication means supported by the first electronic device 100.

As shown in FIG. 2, the second electronic device 200 supports Wi-Fi, but not Bluetooth, as its alternative communication means.

In such case, the handover select message may include information on a Wi-Fi communication module that is supported by the second electronic device 200 as information on the alternative communication means.

The specific information included in the handover select message is to be described later.

The first electronic device 100 may perform data communication with the second electronic device 200 via an alternative communication means (S130).

For this purpose, the first electronic device 100 may obtain information on the alternative communication means supported by the second electronic device 200 by receiving the handover select message from the second electronic device 200. For example, the first electronic device 100 may verify that the alternative communication means supported by the second electronic device 200 is Wi-Fi.

Accordingly, based on the information obtained by transmission and reception of the handover request message and handover select message, the first electronic device 100 may conduct a series of processes for handover to the second electronic device 200 and other communication means. Accordingly, the first electronic device and the second electronic device may switch from the NFC link to a Wi-Fi link so that the electronic devices may continue Wi-Fi protocol-based communication.

As the link between the first electronic device 100 and the second electronic device 200 hands over from NFC to Wi-Fi, the first electronic device 100 and the second electronic device 200 may communicate with each other even when they are not positioned within the NFC communication range as shown in FIG. 2, and may exchange data therebetween at a higher speed than that of the NFC link.

In other words, in case the first electronic device 100 is a smart phone, a user may form an NFC link by bringing the smart phone close to the second electronic device 200 and tagging it with the second electronic device 200 to thereby form an NFC link, and may switch its linking means to Wi-Fi by performing a handover protocol. After the linking means has been changed, even when the user carries the smart phone off the NFC communication range, the smart phone may continue to perform data communication with the second electronic device 200 via Wi-Fi.

The handover process according to steps S110 to S130 above is denoted a negotiated handover. That is, the negotiated handover refers to two NFC first electronic devices 100, for example, the electronic devices 100 and 200, exchanging messages for agreeing to the alternative communication means.

Figure 3:
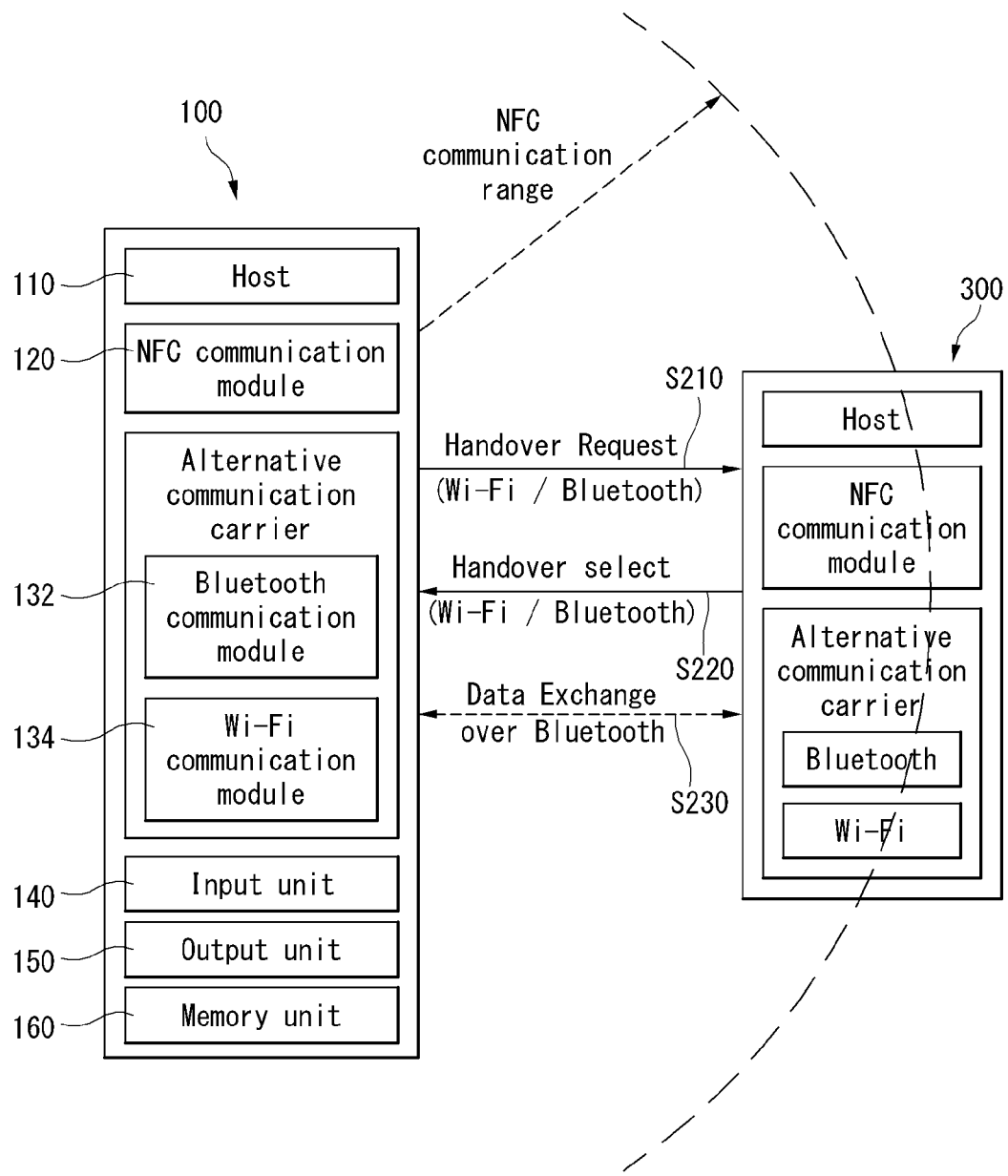
FIG. 3 is a view illustrating handover according to a second embodiment of the present invention.

FIG. 3 is a view illustrating handover according to a second embodiment of the present invention.

The description of handover according to the second embodiment with reference to FIG. 3, which overlaps the first embodiment described in connection with FIG. 2 will be not repeated.

The third electronic device 300 illustrated in FIG. 3, unlike the second electronic device 200 shown in FIG. 2, may simultaneously support a plurality of alternative communication means, for example, Bluetooth and Wi-Fi.

The first electronic device 100 may transmit a handover request message to the third electronic device 300 (S210). In other words, the first electronic device 100 is a handover requester, and the third electronic device 300 is a handover selector. Step S210 is the same as step S110, which has been described above in connection with FIG. 2 and its description is skipped.

The third electronic device 300 may transmit to the first electronic device 100 a handover select message in response to the handover request message received (S220).

The handover select message transmitted from the third electronic device 300 may include on alternative communication means, e.g., Wi-Fi and Bluetooth. Further, the handover select message, as shown in FIG. 3, may give a higher priority to Wi-Fi, by positioning Wi-Fi ahead of Bluetooth.

The first electronic device 100 may communicate with the third electronic device 300 via the alternative communication means (S230).

The first electronic device 100 may determine that the third electronic device 300 supports a plurality of alternative communication means from the handover select message obtained in step S120.

The first electronic device 100, in case the handover selector, i.e., the third electronic device 300 supports a plurality of alternative communication means, may select one or all of the plurality of alternative communication means. Further, in case the first electronic device 100 selects one alternative communication means, the first electronic device 100 may select a alternative communication means according to the priorities of the alternative communication means designated by the third electronic device 300 or may select its favored alternative communication means regardless of the priorities of the alternative communication means designated by the third electronic device 300.

Referring to FIG. 3, the first electronic device 100 may select Bluetooth as an alternative communication means irrespective of the priorities of the alternative communication means assigned by the third electronic device 300.

Figure 4:
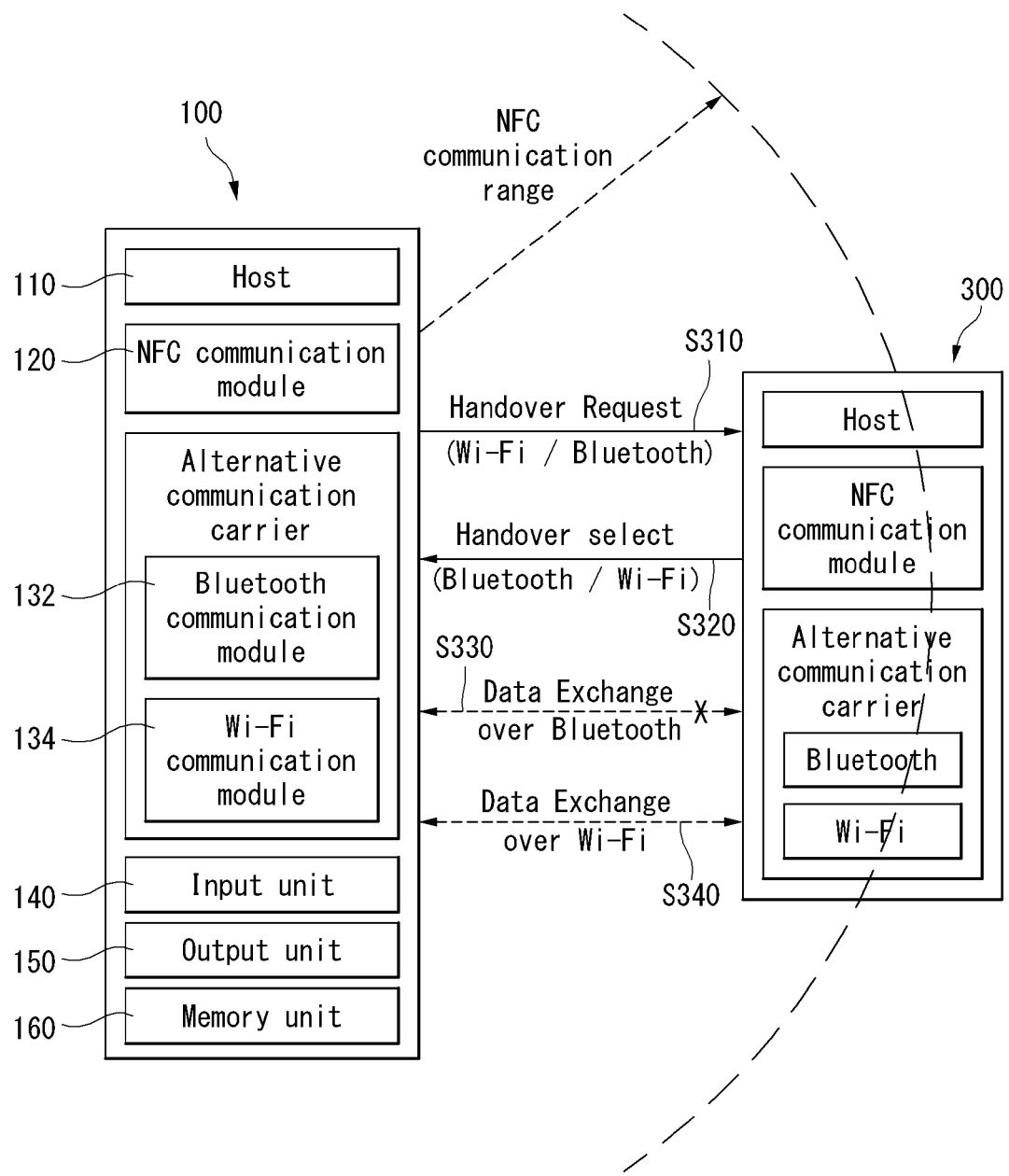
FIG. 4 is a view illustrating handover according to a third embodiment of the present invention.

FIG. 4 is a view illustrating handover according to a third embodiment of the present invention.

Step S310 of FIG. 4 is the same as step S210 described in connection with FIG. 3 and its description is skipped.

The third electronic device 300 may transmit a handover select message to the first electronic device 100 (S330). At this time, as illustrated in FIG. 4, the handover select message may put a higher priority to Bluetooth of Bluetooth and Wi-Fi which are alternative communication means.

In such case, the first electronic device 100 may first attempt to do Bluetooth pairing according to the priorities designated by the third electronic device 300, which is a handover selector, among a plurality of alternative communication means (S330).

Various causes may lead the Bluetooth pairing to a failure. For example, in case, upon performing a handover protocol, the first electronic device 100 and the third electronic device 300 are located off a Bluetooth signal range, the Bluetooth pairing may fail.

Meanwhile, in case, when a handover protocol proceeds, the first electronic device 100 and the third electronic device 300 are positioned within a Bluetooth signal range so that a handover to Bluetooth takes place, and while data exchange is conducted via a Bluetooth link, at least one of the first electronic device 100 and the third electronic device 300 moves, so that both devices end up being located off the Bluetooth signal range, the Bluetooth link may fail.

At this time, the first electronic device 100 may keep performing data communication with the third electronic device 300 via Wi-Fi which is an alternative communication means with a lower priority (S340).

Figure 5:
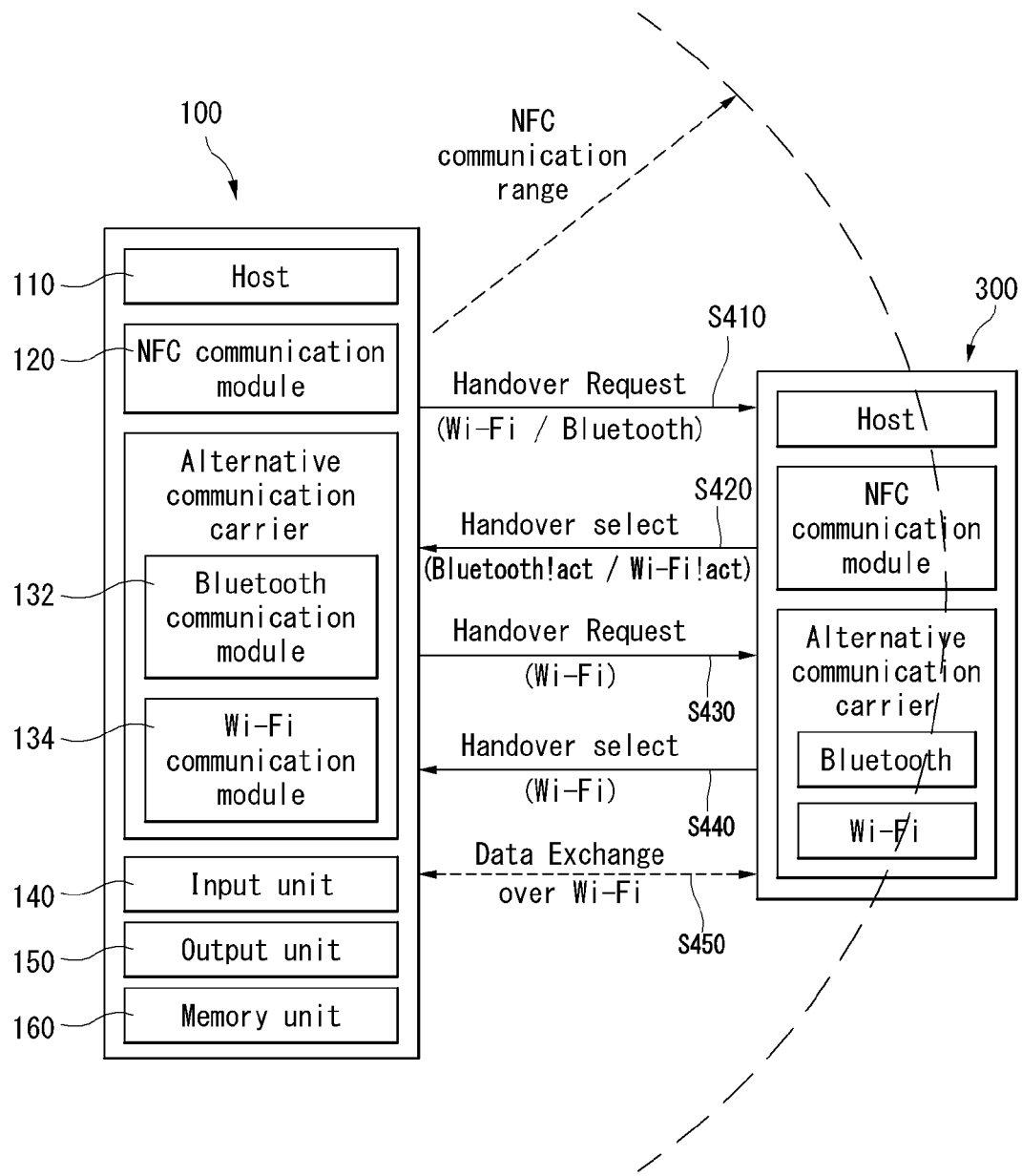
FIG. 5 is a view illustrating handover according to a fourth embodiment of the present invention.

FIG. 5 is a view illustrating handover according to fourth embodiment of the present invention.

Step S410 of FIG. 5 is the same as step S310 described in connection with FIG. 4 and thus its description is omitted.

The third electronic device 300, illustrated in FIG. 5, may transmit to the first electronic device 100 a handover select message in response to the handover request message received from the first electronic device 100 (S420).

At this time, the handover select message may include power state information of the alternative communication means, provided from the third electronic device 300.

For example, the third electronic device 300, in case there is an alternative communication means supported by the third electronic device 300 among alternative communication means supported by the first electronic device 100, may transmit to the first electronic device 100 power state information of each alternative communication means supported by the third electronic device 300, for example, information on activation or deactivation.

For example, as shown in FIG. 5, the handover select message may include information indicating that the alternative communication means, Bluetooth and Wi-Fi, of the first electronic device 100 remain deactivated.

In case the received handover select message includes information on a plurality of alternative communication means, the first electronic device 100 may select any alternative communication means as described above. In the instant embodiment, it is assumed that the first electronic device 100 selects Wi-Fi as an alternative communication means.

The first electronic device 100 re-transmits a handover request message to the third electronic device 300 (S430). At this time, the handover request message transmitted in step S430 may designate one of the plurality of alternative communication means received. That is, the first electronic device 100 may enable the Wi-Fi module of the third electronic device 300 to be activated by designating Wi-Fi as an alternative communication means in step S430 and transmitting to the third electronic device 300 a handover request message to designate only Wi-Fi as alternative communication means.

In response to the handover request message received in step S430, the third electronic device 300 activates power of the Wi-Fi module and may transmit to the first electronic device 100 a message responding to the handover request message received in step S430 (S440).

The first electronic device 100 may conduct data exchange with the first electronic device 100 via Wi-Fi (S450).

In other words, in case the Wi-Fi module of the third electronic device 300 is activated, the first electronic device 100 may form a Wi-Fi link with the third electronic device 300. That is, the first electronic device 100 may hand the NFC link with the third electronic device 300 over to the Wi-Fi link.

In accordance with the embodiment described in connection with FIG. 5, the third electronic device 300, which is a handover selector, may save power by leaving a power of the alternative communication means to be deactivated until, among a plurality of alternative communication means, a specific alternative communication means is selected.

Figure 6:
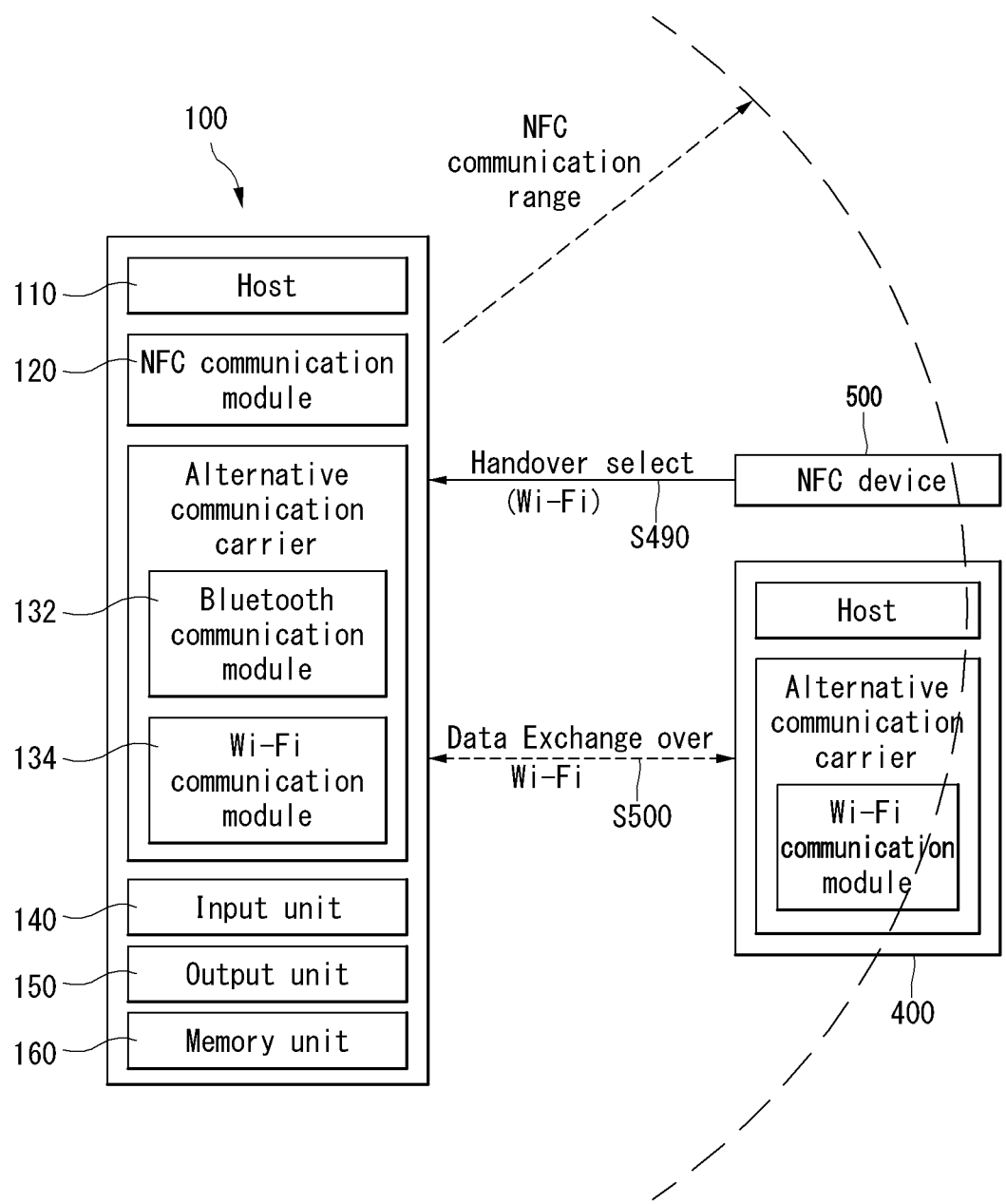
FIG. 6 is a view illustrating handover according to a fifth embodiment of the present invention.

FIG. 6 is a view illustrating handover according to a fifth embodiment of the present invention.

The handover according to the fifth embodiment of the present invention, unlike the handover described above, is performed using two separate handover selecting devices. That is, in accordance with the fifth embodiment, the handover selecting devices may include a fourth electronic device 400 and an NFC device 500 separately provided.

As shown, the fourth electronic device 400 may include a host and an alternative communication means. For example, the alternative communication means may be a Wi-Fi communication module.

Further, the fourth electronic device 400 does not include the NFC device 500. That is, since the fourth electronic device 400 does not support an NFC communication function, the fourth electronic device 400 might not form an NFC connection with the first electronic device 100.

The NFC device 500 illustrated in FIG. 6 may include information for accessing the Wi-Fi module of the fourth electronic device 400. The NFC device 500 may include, as a handover select message, information necessary for accessing the Wi-Fi module of the fourth electronic device 400. The handover select message may include a handover selection record and additional information to be described later.

The first electronic device 100 may receive the handover select message from the NFC device 500 by tagging the NFC device 500 (S490).

When receiving the handover select message, the first electronic device 100 may form a Wi-Fi connection with the fourth electronic device 400 based on the handover select message (S500).

The handover described in connection with FIG. 6, unlike the negotiated handover described earlier, is denoted static handover.

A handover protocol in which two electronic devices easily form an NFC link through tagging and then perform communication via an alternative communication means suitable for more remote and/or high-capacity data transmission than the NFC link has been described thus far.

However, in case the two electronic devices to execute handover have low mobility, the two electronic devices might not easily form a near-field communication link. For example, in case the first electronic device 100 is a DTV having an NFC communication module, and the second electronic device 200 is a computer having an NFC communication module, the DTV and computer are bulky and heavy and thus may have difficulty in forming an NFC communication link. That is, it might not be easy to perform a handover protocol by forming an NFC link.

In such case, a connection may be established between electronic devices having low mobility via an electronic device having high mobility. As described above by way of example, in case the first electronic device 100 is a DTV and the second electronic device 200 is a computer, the third electronic device 300 having high mobility, for example, a smart phone, may mediate in the handover protocol between the DTV and the computer.

As such, that electronic devices to perform a handover protocol are positioned at fixed locations and an electronic device having high mobility assists in making a connection between the electronic devices so as to create a communication channel therebetween is denoted handover mediation. The handover mediation is an arbitrary term, and thus, may be referred to by other various terms, such as handover relay, connection information relay, or multi-tagging for link. Such terms are arbitrarily provided, and thus, may be interchangeable with other terms by one of ordinary skill in the art at his preference. Hereinafter, the term "handover mediation protocol" is used for ease of description.

Hereinafter, a handover mediation protocol according to another embodiment of the present invention is described in further detail with reference to drawings.

Figure 7:
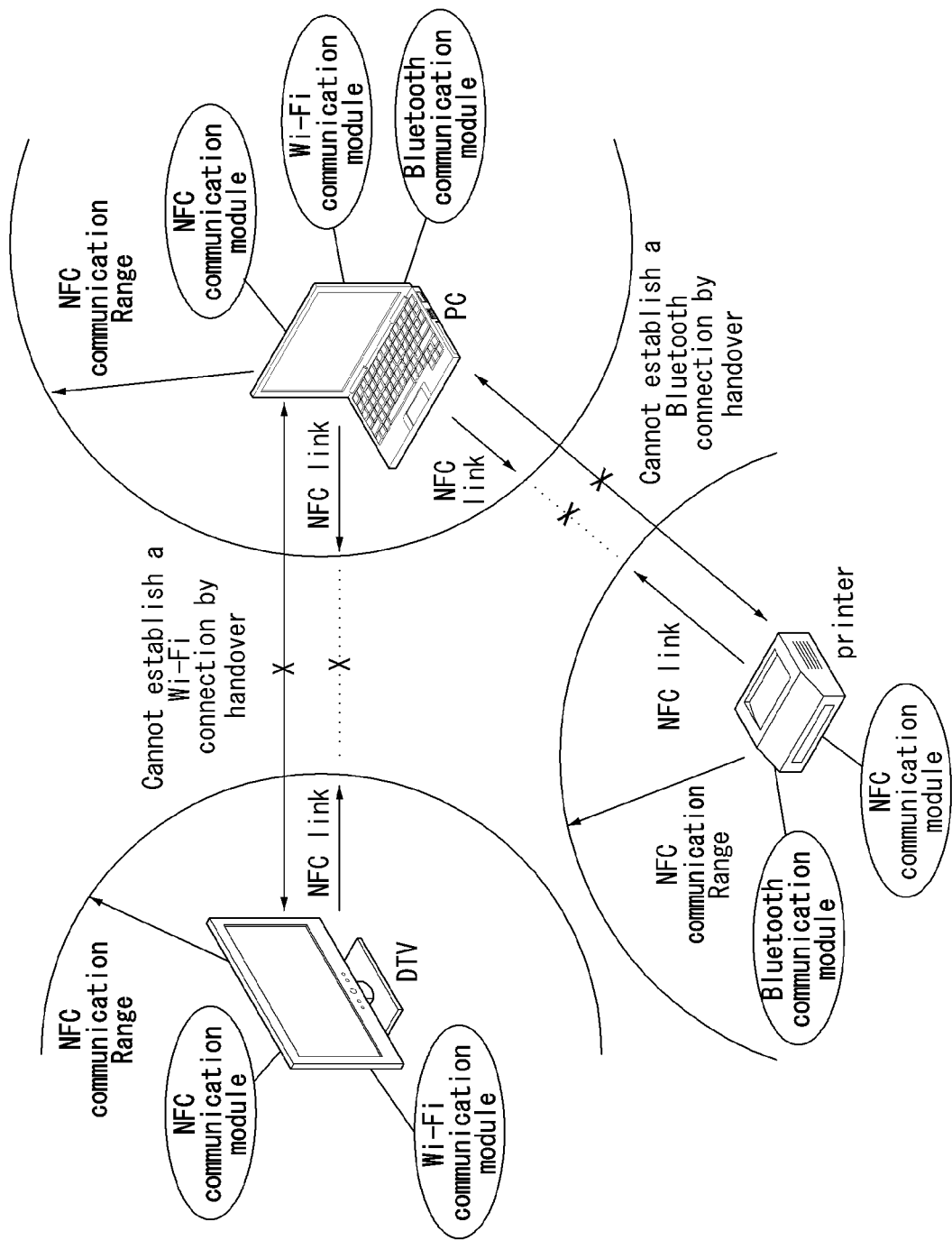
FIG. 7 is a view illustrating an environment that requires a handover mediation protocol according to another embodiment of the present invention.

FIG. 7 is a view illustrating an environment requiring a handover mediation protocol according to another embodiment of the present invention.

As illustrated in FIG. 7, it is assumed that a DTV supports NFC and Wi-Fi communication, a PC supports NFC, Wi-Fi, and Bluetooth communication, and a printer supports NFC and Bluetooth communication. However, the alternative communication means supported by the electronic devices are not limited to Wi-Fi and Bluetooth communication.

Further, it is assumed that the DTV, PC, and printer are positioned off an NFC communication range. In such case, it may be difficult for a user to execute a handover protocol between the DTV and PC or between the printer and PC. That is, the user may have difficulty in bring the DTV and PC in the NFC communication range. As such, since it is not easy to form an NFC link between the DTV and PC, it is not easy to establish a Wi-Fi connection via the handover protocol, either. Further, for the same reason, it is not easy to form an NFC link between the printer and PC, and thus, it is difficult to establish a Bluetooth connection via the handover protocol.

In such case, a handover mediation protocol may be used to assist in establishing a Wi-Fi connection between the DTV and PC and a Bluetooth connection between the printer and the PC.

Hereinafter, the handover mediation protocol is described in greater detail.

Figure 8:
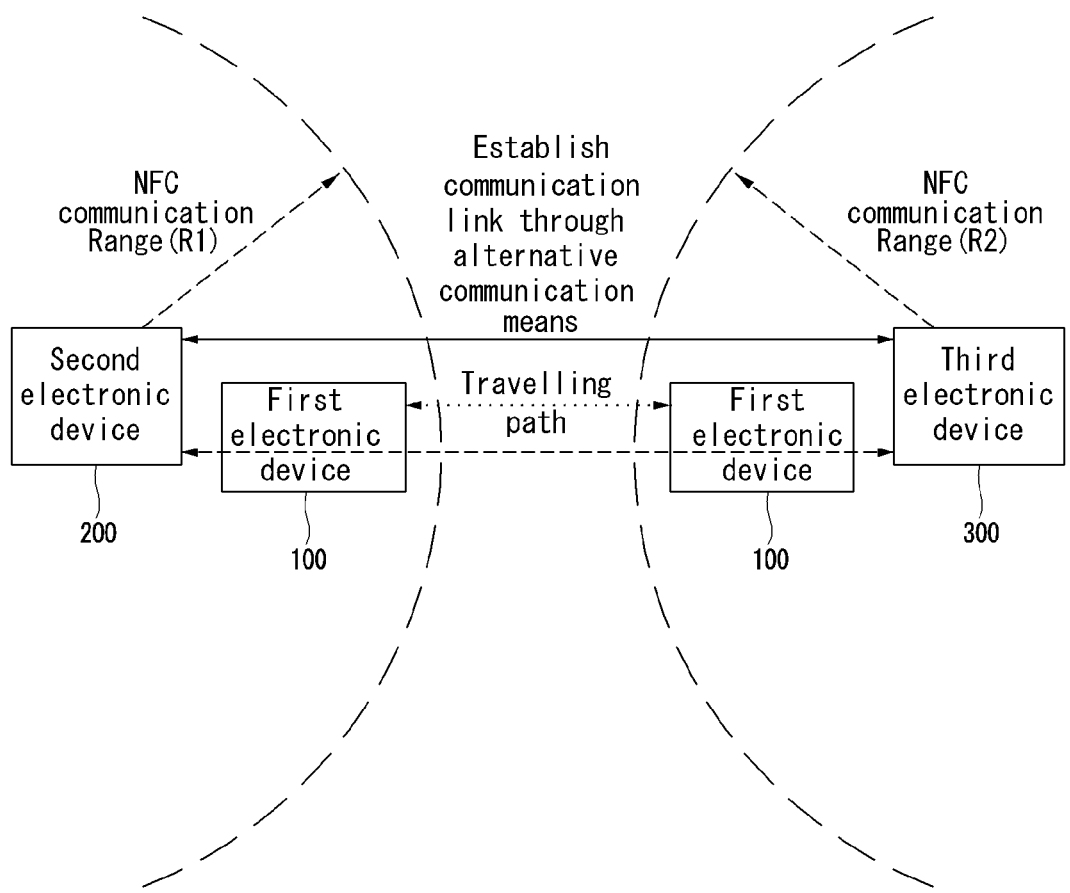
FIG. 8 is a view schematically illustrating handover mediation according to another embodiment of the present invention.

FIG. 8 is a view schematically illustrating handover mediation according to another embodiment of the present invention. For better understanding, it is assumed that the first electronic device 100 illustrated in FIG. 8 is a smart phone, the second electronic device 200 a DTV, and the third electronic device 300 a PC. However, the smart phone, DTV, and PC are merely examples, and the first to third electronic devices may include more diverse types of devices. Further, the handover mediation may be performed a plurality of electronic devices, in addition to the first to third electronic devices.

As illustrated in FIG. 8, the second electronic device 200 and the third electronic device 300 are located departing from an NFC communication link, so that the second electronic device 200 and third electronic device 300 may have difficulty in performing a handover protocol by forming an NFC communication link. Or, even when the second electronic device 200 and the third electronic device 300 are positioned within the NFC communication link range, they are low in mobility and thus may have difficulty in performing a handover protocol via the NFC communication link.

Here, the first electronic device 100 may go inside the NFC communication range of the second electronic device 200, which is radius R1 or less, and thus, the first electronic device 100 may form an NFC communication link with the second electronic device 200. The first electronic device 100 may acquire information related to an alternative communication means supported by the second electronic device 200 from the second electronic device 200 via the NFC communication link. The information related to the alternative communication means is described below.

Further, a user may, here, input a message requesting execution of a handover mediation protocol with the second electronic device 200 via the input unit 140 of the first electronic device 100. Further, when obtaining the information related to the communication means supported by the second electronic device 200 from the second electronic device 200 according to the message, the first electronic device 100 may inform the user via the output unit 150 that the information related to the communication means of the second electronic device 200 has been acquired.

Further, the first electronic device 100 may go into radius R2 or less that is the NFC communication range of the third electronic device 300, and thus, the first electronic device 100 may form an NFC communication link with the third electronic device 300. Here, the first electronic device 100 may obtain information related to an alternative communication means supported by the third electronic device 300 from the third electronic device 300 via the NFC communication link. Or, the first electronic device 100 may deliver the information related to the alternative communication means supported by the second electronic device 200, obtained from the second electronic device 200, to the third electronic device 300.

Here, a user may input a message requesting execution of a handover mediation protocol with the third electronic device 300 through the input unit 140 of the first electronic device 100. Further, when obtaining the information related to the communication means supported by the second electronic device 200 from the third electronic device 300, the first electronic device 100 may output, through the output unit 150, information indicating that the information related to the communication means of the third electronic device 300 has been obtained or information indicating that the information related to the communication means, obtained from the second electronic device 200, has been delivered to the third electronic device 300.

Further, at least one alternative communication means that may be commonly used by the second electronic device 200 and the third electronic device 300 may be selected by at least one of the first electronic device 100 to the third electronic device 300. A communication link between the second electronic device 200 and the third electronic device 300 may be formed via the selected at least one alternative communication means.

Here, the first electronic device 100 may function as a handover mediator for a handover mediation protocol for each of the second electronic device 200 and the third electronic device 300.

Hereinafter, various embodiments for establishing a connection using a handover mediation protocol as described above in connection with FIG. 8 are described in further detail with reference to drawings. Hereinafter, the embodiments of the handover mediation protocol are merely examples, and the scope of the present invention is not limited thereto.

Figure 9:
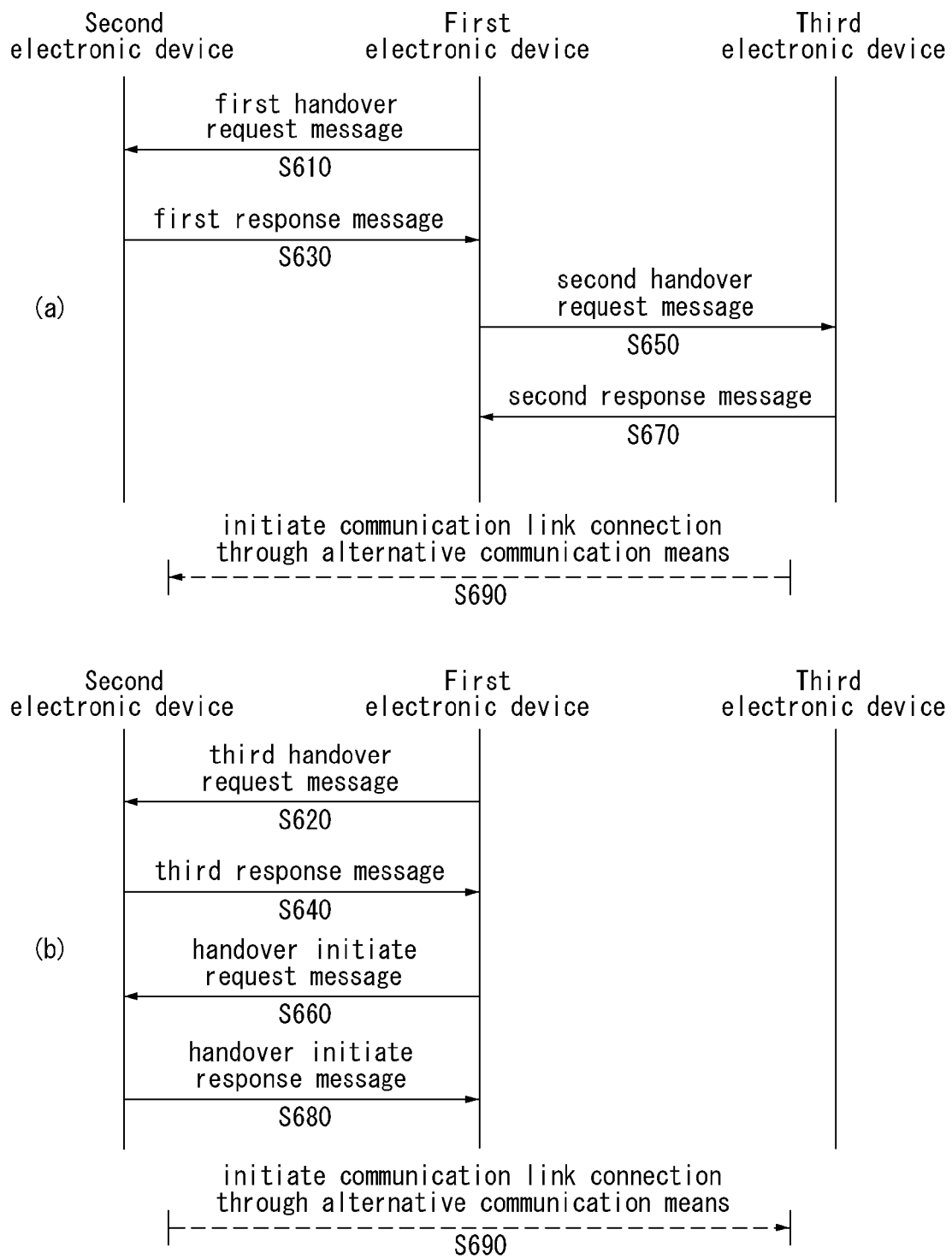
FIG. 9 is a view illustrating a handover mediation protocol according to a first embodiment of the present invention.

FIG. 9 is a view illustrating a handover mediation protocol according to a first embodiment of the present invention. Referring to FIG. 9, a method of forming a communication link between the second electronic device 200 and the third electronic device 300 via the first electronic device 100 is described.

The first electronic device 100 may transmit a first handover request message to the second electronic device 200 via an NFC communication link formed between the first electronic device 100 and the second electronic device 200, described above in connection with FIG. 8 (S610), and the second electronic device 200 may transmit a first response message including information related to a first alternative communication means supported by the second electronic device 200 in response to the first handover request message (S630).

Further, the first electronic device 100 may transmit a second handover request message to the third electronic device 300 via the NFC communication link formed between the first electronic device 100 and the third electronic device 300 described above in connection with FIG. 8 (S650), and the third electronic device 300 may transmit a second response message including information related to a second alternative communication means supported by the third electronic device 300 in response to the second handover request message (S670).

Here, the first handover request message and the second handover request message may be message requesting capability information for the alternative communication means supported by the second electronic device 200 and the third electronic device 300. At this time, the structure of the first and second handover request messages may differ from the handover request message used in the above-described handover protocol.

Accordingly, the first response message and the second response message may include capability information for the alternative communication means supported by the second electronic device 200 and the third electronic device 300. The first response message and the second response message may be denoted handover capabilities messages.

Specific forms of the handover request message and handover capabilities message are to be described later.

Further, the information related to the first and second alternative communication means may include, at least, the name and configuration information of the alternative communication means. For example, in case the alternative communication means supported by the second electronic device 200 is Wi-Fi, the information related to the alternative communication means may include information indicating that the name of the alternative communication means supported by the second electronic device 200 is Wi-Fi. Further, for example, the configuration information may include access information for establishing a Wi-Fi link with the second electronic device 200, or in case the second electronic device 200 remains linked to a separate Wi-Fi AP (Access Point), access information necessary for accessing the Wi-Fi AP.

Further, the second electronic device 200 and the third electronic device 300 each may provide a plurality of alternative communication means. In case only one alternative communication means is offered by each of the second electronic device 200 and the third electronic device 300, there may be one or more pieces of information related to the alternative communication means.

Accordingly, connection of a communication link between the second electronic device 200 and the third electronic device 300 may be initiated by the second electronic device 200 or the third electronic device 300 through one alternative communication means selected based on the information related to the first alternative communication means and the information related to the second alternative communication means (S690). FIG. 9(a) illustrates an example in which connection of the communication link is initiated by the third electronic device 300.

Here, the first electronic device 100 may select one alternative communication means jointly supported by the second electronic device 200 and the third electronic device 300 based on the information related to the first alternative communication means and the information related to the second alternative communication means.

At this time, in case the second electronic device 200 and the third electronic device 300 jointly support one or more alternative communication means, the first electronic device 100 may automatically select the priorities of the alternative communication means. Or, the first electronic device 100 may select one alternative communication means according to the priority assigned to any one device among the first electronic device 100 to the third electronic device 300. Further, one alternative communication means commonly supported by the second electronic device 200 and the third electronic device 300 may be, of course, selected by the second electronic device 200 or the third electronic device 300, rather than the first electronic device 100. Further, a user may designate his desired alternative communication means through a user interface.

Accordingly, a connection of the communication link between the second electronic device 200 and the third electronic device 300 may be initiated through one alternative communication means selected by any one of the first electronic device 100 to the third electronic device 300 or by the user.

Meanwhile, the first electronic device 100 may send a request to the second electronic device 200 or the third electronic device 300 for initiating a connection of the communication link through the selected alternative communication means. Hereinafter, an example in which the first electronic device 100 transmits to the second electronic device 200 or the third electronic device 300 a separate message requesting initiating a connection of a communication link is described with reference to FIG. 9(b).

Referring to FIG. 9(b), the first electronic device 100 may transmit a separate message requesting initiating a connection of a communication link through the selected alternative communication means to the second electronic device 200 or the third electronic device 300 (S660). The message requesting initiating a connection of a communication link may be referred to as a handover initiate request message. The handover initiate request message may include information related to the first alternative communication means or information related to the second alternative communication means or information related to the alternative communication means selected by the first electronic device 100 or a user.

Further, the second electronic device 200 or third electronic device 300 may transmit a handover initiate response message in response to the handover initiate request message (S680). The handover initiate response message may information on whether to accept establishing a communication link by the alternative communication means included in the handover initiate request message. Accordingly, the response message may include the message accepting establishing a communication link by the alternative communication means selected and thus the second electronic device 200 or the third electronic device 300 may initiate connection of the communication link (S690).

Here, as illustrated in FIG. 9(b), in case the first electronic device 100 requests initiating the communication link on the second electronic device 200, the first electronic device 100 may transmit a third handover request message verifying whether the version of the second electronic device 200 supports a handover mediation protocol for backward compatibility before transmitting the handover initiate request message (S620).

Further, the third handover request message may have the same structure as the first handover request message and the second handover request message described above in connection with FIG. 9(a). Further, the second electronic device 200 may transmit a third response message in response to the third handover request message. The third response message may have the same structure as the handover capabilities message described above in connection with FIG. 9(a).

Meanwhile, the case where the version of the second electronic device 200 and/or the third electronic device 300 does not support the handover mediation protocol according to another embodiment of the present invention will be described later.

Accordingly, even when the second electronic device 200 and the third electronic device 300 are positioned departing from the NFC communication range or they are located within the NFC communication range but have difficulty in making a connection through the NFC communication link due to low mobility, they may perform communication via the alternative communication means via the first electronic device 100 as shown in FIGS. 9(a) and (b).

Figure 10:
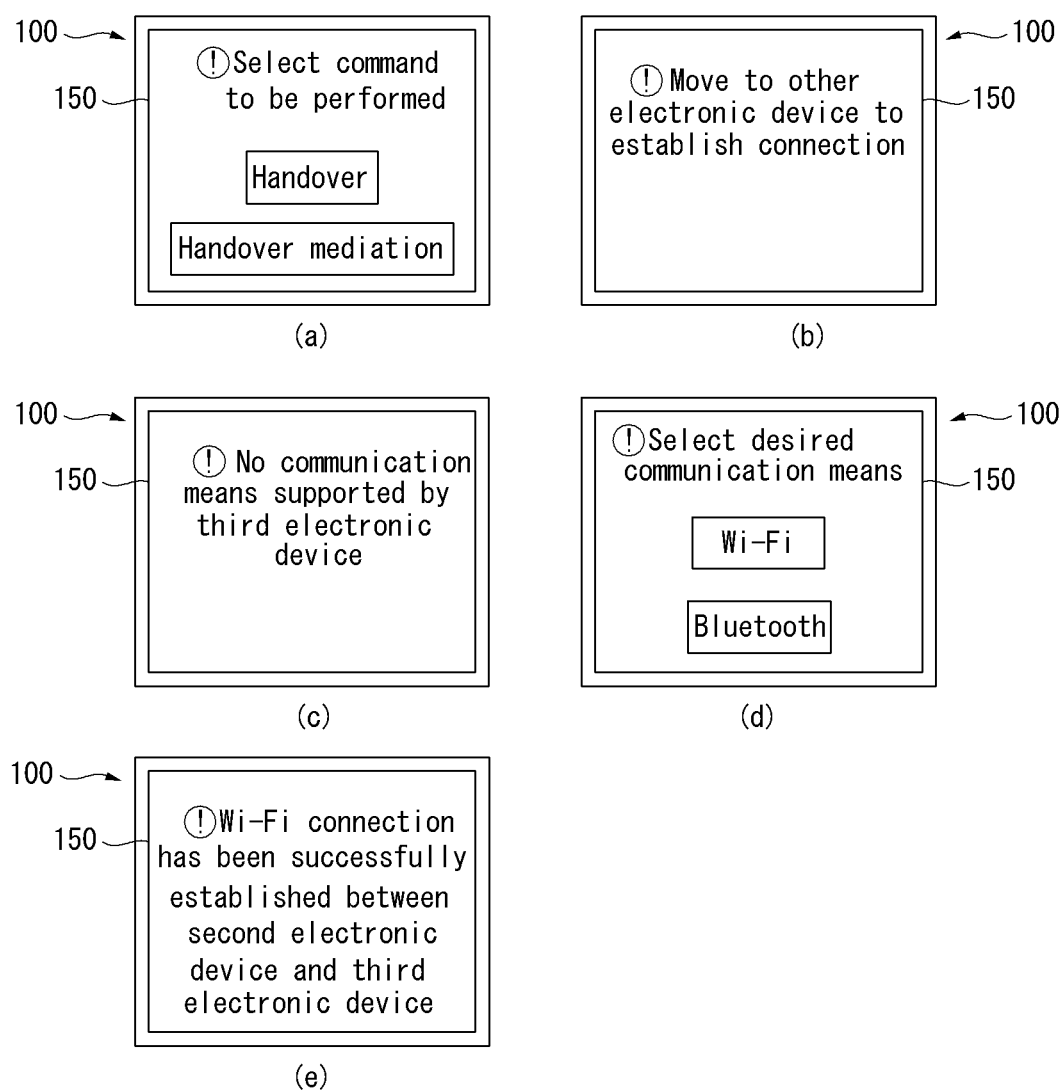
FIG. 10 is a view illustrating a guide message used for a handover mediation protocol according to the present invention.

FIG. 10 is a view illustrating a guide message used for a handover mediation protocol according to a first embodiment of the present invention.

First, a user may order the first electronic device 100 to execute a handover mediation protocol by selecting handover mediation through an output user interface as illustrated in FIG. 10(a). Meanwhile, the second electronic device 200 may output a user interface as illustrated in FIG. 10(a). Hereinafter, for ease of description, the first electronic device 100 is described. However, the same user interaction as the first electronic device 100 may also be provided to the second electronic device 200.

The first electronic device 100 may obtain information related to the first alternative communication means supported by the second electronic device 200 via an NFC communication link within an NFC communication range of the second electronic device 200 and then may output a guide message instructing move to another electronic device to perform handover mediation, as shown in FIG. 10(b).

Further, the first electronic device 100, in step S630 or S670, in case there is no alternative communication means supported by the second electronic device 200 or the third electronic device 300, may output a guide message indicating that there is no communication means supported by the third electronic device, as shown in FIG. 10(c).

Further, in case the second electronic device 200 and the third electronic device 300 jointly support a plurality of alternative communication means, for example, when Wi-Fi and Bluetooth both are supported as shown in FIG. 10(d), a user may designate Wi-Fi as an alternative communication means to be used for forming a communication link between the second electronic device 200 and the third electronic device 300 by selecting Wi-Fi on the user interface output by the first electronic device 100.

Further, as described in connection with step S690, in case the connection of a communication link through an alternative communication means between the second electronic device 200 and the third electronic device 300 via the first electronic device 100 is initiated, at least one of the first electronic device 100, the second electronic device 200 and the third electronic device 300 may output through its output unit information indicating that the connection has been established, as illustrated in FIG. 10(e).

Figure 11:
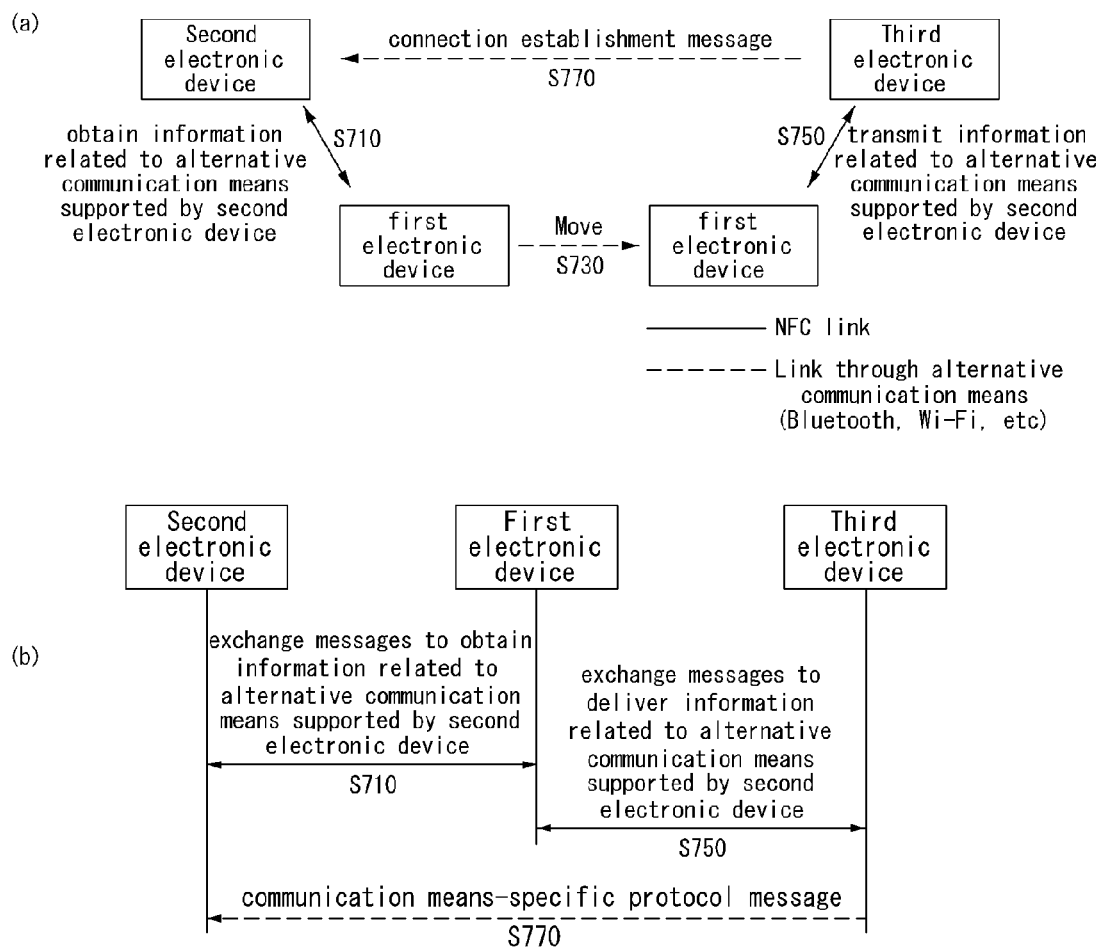
FIG. 11 is a view illustrating a handover mediation protocol according to a second embodiment of the present invention.

FIG. 11 is a view illustrating a handover mediation protocol according to a second embodiment of the present invention. Here, the same user interaction as described in connection with FIG. 10 may be offered, of course.

Referring FIGS. 11(a) and (b), the first electronic device 100 and the second electronic device 200 may obtain information related to an alternative communication means supported by the second electronic device 200 and may exchange messages for obtaining the information related to the alternative communication means (S710).

Here, the first electronic device 100 may transmit a message for obtaining the information related to the alternative communication means supported by the second electronic device 200 through an NFC communication link formed between the first electronic device 100 and the second electronic device 200, described in connection with FIG. 8. Such message may be referred to as handover get message, as described above in connection with FIG. 10(a). Further, in response to the handover get message, the second electronic device 200 may transmit a message including information related to a first alternative communication means supported by the second electronic device 200. Such message may be referred to as handover select message.

Further, the handover get message and the handover select message may respectively correspond to the handover request message and the handover capabilities message, described above in connection with FIG. 9, and may have the same structures as the handover request message and the handover capabilities message.

Meanwhile, in case there is no alternative communication means supported by the second electronic device 200 or initiation of a communication link through an alternative communication means is not desired, the handover select message might not include information related to the alternative communication means.

Further, as illustrated in FIG. 11(a), the first electronic device 100 may travel into the NFC communication range of the third electronic device 300 (S730). Further, as illustrated in FIGS. 11(a) and (b), the information related to the first alternative communication means obtained from the second electronic device 200 may be delivered to the third electronic device 300, and a message for delivering the information related to the first alternative communication means may be exchanged (S750).

Here, the first electronic device 100 may transmit a message for delivering the information related to the first alternative communication means to the third electronic device 300 through an NFC communication link formed between the first electronic device 100 and the third electronic device 300, described above in connection with FIG. 8. In such case, the first electronic device 100 merely delivers the information related to the first alternative communication means obtained in step S710. Accordingly, it may be denoted a handover put message, distinguished from the handover get message described above in connection with step S710. Further, the third electronic device 300 may transmit a response message including information related to initiation of a communication link in response to the handover put message.

Here, the information related to initiation of a communication link included in the response message may include information on whether the third electronic device 300 is to agree with connection of a communication link by at least one alternative communication means, included in the information related to the first alternative communication means included in the handover put message.

For example, if the third electronic device 300 may transmit a response message agreeing with connection of a communication link by at least one alternative communication means, the response message may be denoted handover ACK message. Further, the handover ACK message may include information on which one of the second electronic device 200 and the third electronic device 300 is to initiate connection of the communication link.

Meanwhile, in case a plurality of alternative communication means is included in the information related to the first alternative communication means included in the handover get message, the third electronic device 300 may select one alternative communication means and this may be included in the response message. Accordingly, the first electronic device 100 may send a request for initiation of a communication link through the selected alternative communication means to the second electronic device 200 or the third electronic device 300 based on the information included in the response message.

Further, for example, in case the third electronic device 300 does not desire connection of a communication link by at least one alternative communication means or in case connection of a communication link by at least one alternative communication means is impossible, the third electronic device 300 may transmit a response message disagreeing with connection of a communication link, and in such case, the response message may be denoted handover NACK message.

Further, as illustrated in FIGS. 11(*a*) and (*b*), in case the third electronic device 300 initiates connection of a communication link, the third electronic device 300 may transmit to the second electronic device 200 a message requesting establishment of a communication link (S770). The message requesting establishment of a communication link may be referred to as a connection establishment message or communication means specific protocol message.

Meanwhile, the specific forms of the handover get message, handover put message, handover select message, and handover ACK/NACK messages are to be described later.

Accordingly, even when the second electronic device 200 and the third electronic device 300 are positioned off the NFC communication range or have difficulty in connection via an NFC communication link due to poor mobility, they may communicate with each other by an alternative communication means, via the first electronic device 100, as illustrated in FIG. 11.

Figure 12:
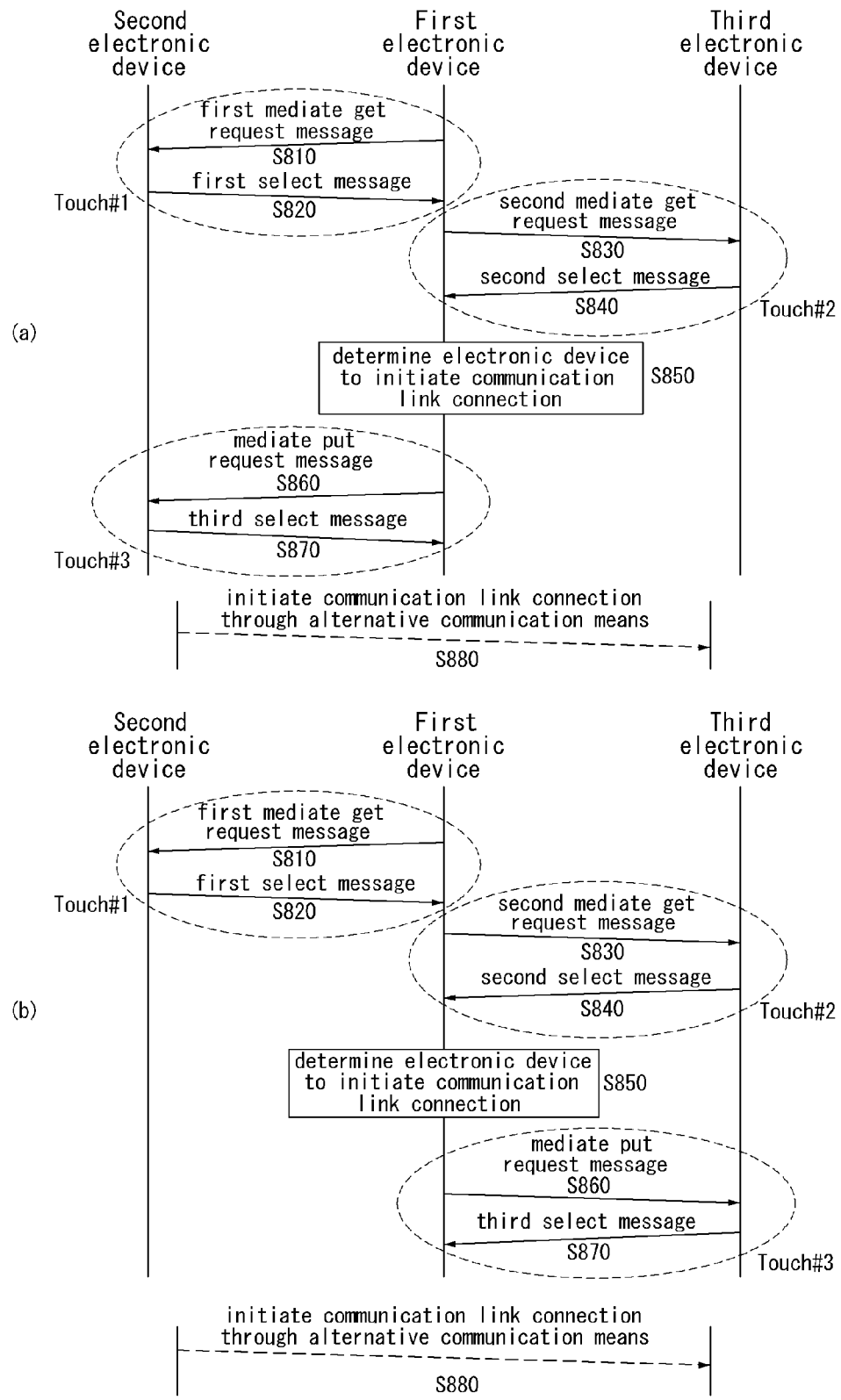
FIGS. 12 and 13 are views illustrating a handover mediation protocol according to a third embodiment of the present invention.

FIG. 12 is a view illustrating a handover mediation protocol according to a third embodiment of the present invention. Here, the same user interaction as described above in connection with FIG. 10 may be offered, of course.

Referring to FIG. 12, the first electronic device 100 may transmit a message for obtaining information related to a first alternative communication means supported by the second electronic device 200 to the second electronic device 200 through an NFC communication link formed between the first electronic device 100 and the second electronic device 200, as described above in connection with FIG. 8 (S810). The message for obtaining the information related to the first alternative communication means may be denoted first mediate get request message. Further, the second electronic device 200 may transmit a first select message including information related to the first alternative communication means in response to the first mediate get request message (S820).

Further, the first electronic device 100 may transmit a message for obtaining information related to a second alternative communication means supported by the third electronic device 300 to the third electronic device 300 through an NFC communication link formed between the first electronic device 100 and the third electronic device 300, as described above in connection with FIG. 8 (S830). The message for obtaining the information related to the second alternative communication means may be referred to as a second mediate get request message. Further, the third electronic device 300 may transmit a second select message including the information related to the second alternative communication means in response to the second mediate get request message (S840).

Here, the first electronic device 100 mediates handover between the second electronic device 200 and the third electronic device 300, and thus, the first electronic device 100 may be considered a handover mediator. Further, steps S810 to S840 of FIG. 12 respectively correspond to steps S610, S630, S650, and S670 of FIG. 9, and thus, the description thereof is skipped. The handover request message described above in connection with FIG. 9 and the handover get message described above in connection with FIG. 11 may correspond to the mediate get request message described above in connection with FIG. 12, and may have the same structure as the mediate get request message.

Further, as illustrated in FIGS. 12(*a*) and (*b*), the first electronic device 100 may determine one of the second electronic device 200 or the third electronic device 300 as an electronic device to initiate a communication link through an alternative communication means (S850). Or, a user may determine one of the second electronic device 200 or the third electronic device 300 as an electronic device to initiate a communication link through an alternative communication means, of course.

Further, the first electronic device 100 may transmit a message requesting initiation of a communication link through an alternative communication means to the second electronic device 200 or the third electronic device 300 depending on the determination (S860), and the message requesting initiation of a communication link may include information related to the first alternative communication means or information related to the second alternative communication means. Here, the message requesting initiation of a communication link provides a message related to the first alternative communication means or message related to the second alternative communication means to the third electronic device 300 or the second electronic device 200, and thus, the message requesting initiation of a communication link may be denoted a mediate put request message.

For example, referring to FIG. 12(*a*), in case the first electronic device 100 transmits a request for initiation of a communication link to the second electronic device 200, the mediate put request message may include information related to the second alternative communication means. Further, for example, referring to FIG. 12(*b*), in case the first electronic device 100 transmits a request for initiation of a communication link to the third electronic device 300, the mediate put request message may include information related to the first alternative communication means.

Further, the second electronic device 200 or the third electronic device 300 may transmit a third select message in response to the mediate put request message (S870). The third select message may include information on whether to agree with initiation of a communication link by the alternative communication means included in the mediate put request message.

For example, referring to FIG. 12(*a*), in case the first electronic device 100 transmits a request for initiation of a communication link to the second electronic device 200, the third select message may include information on whether to agree with initiation of a communication link by an alternative communication means supported by the third electronic device 300.

Further, for example, referring to FIG. 12(b), in case the first electronic device 100 transmits a request for initiation of a communication link to the third electronic device 300, the third select message may include information on whether to agree with initiation of a communication link by an alternative communication means supported by the second electronic device 200. Here, the mediate get request message and the mediate put request message respectively may correspond to the handover request message described above in connection with FIG. 9(a) and the handover initiate request message described above in connection with FIG. 9(b). Further, the first select message and the second select message may correspond to the handover capabilities message described above in connection with FIG. 9(a), and the third select message may correspond to the handover initiate response message described above in connection with FIG. 9(b) or the handover ACK/NACK message described above in connection with FIG. 11. Further, each corresponding message may have the same structure.

Meanwhile, the specific forms of the mediate get request message, mediate put request message, and select message are to be described later.

Further, the third select message may be information related to one alternative communication means selected by the first electronic device 100 among alternative communication means included in the mediate put request message. Or, the third select message may be information related to one alternative communication means selected by the second electronic device 200, the third electronic device 300 or a user.

Figure 13:
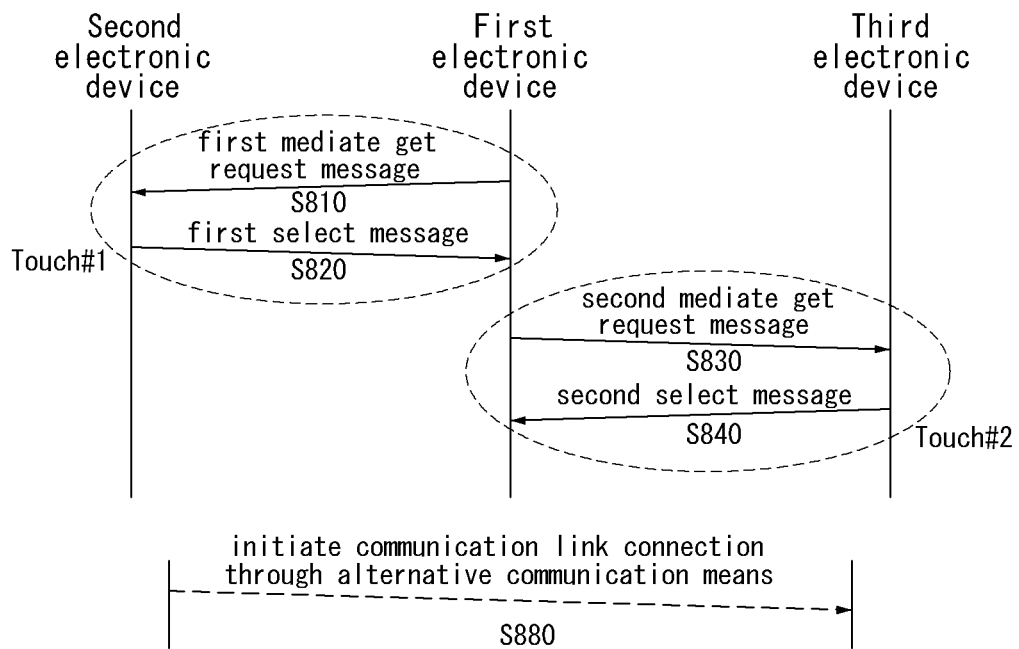

Meanwhile, referring to FIG. 13, in case a user is aware of which one of the second electronic device 200 and the third electronic device 300 is to initiate a communication link, the first electronic device 100 might not transmit the mediate put request message. Accordingly, the second electronic device 200 or the third electronic device 300 may initiate a communication link through the selected alternative communication means (S880).

Accordingly, even when the second electronic device 200 and the third electronic device 300 are positioned off the NFC communication range or have difficulty in connection through an NFC communication link due to poor mobility, they can perform communication via an alternative communication means via the first electronic device 100 as illustrated in FIG. 12.

Figure 14:
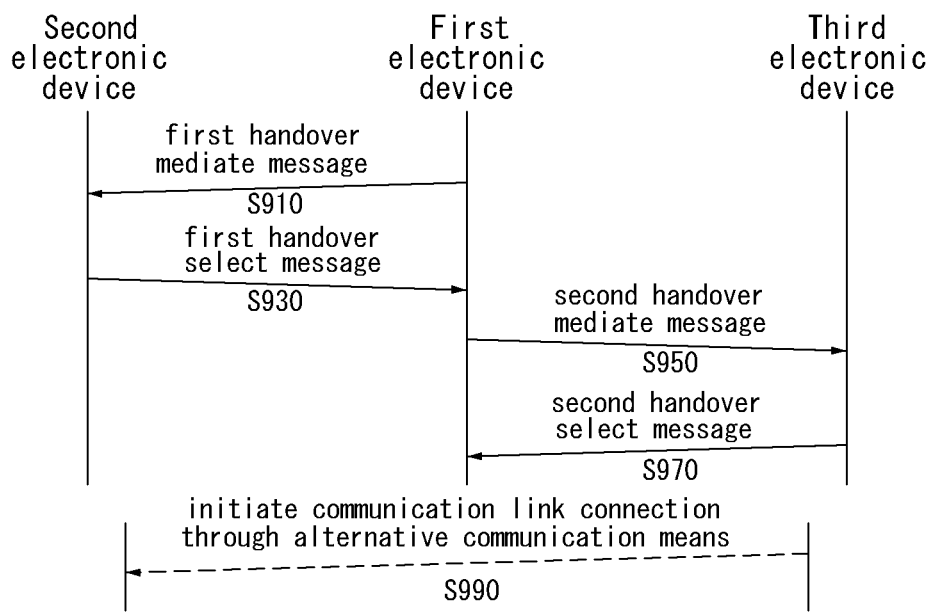
FIG. 14 is a view illustrating a handover mediation protocol according to a fourth embodiment of the present invention.

FIG. 14 is a view illustrating a handover mediation protocol according to a fourth embodiment of the present invention. Here, the same user interaction as described above in connection with FIG. 10 may be offered, of course.

Referring to FIG. 14, the first electronic device 100 may transmit, to the second electronic device 200, a first handover mediate message for obtaining information related to a first alternative communication means supported by the second electronic device 200 (S910). Further, the first electronic device 100 may receive a first handover select message including the information related to the first alternative communication means supported by the second electronic device 200 in response to the first handover mediate message (S930).

Here, steps S910 and S930 respectively may correspond to steps S610 and S630 described above in connection with FIG. 9 and thus the description thereof is skipped. Here, the first handover mediate message may correspond to the first handover request message described above in connection with FIG. 9 and may have the same structure as the first handover request message.

Further, the first electronic device 100 may transmit a second handover mediate message to the third electronic device 300 (S950). The second handover mediate message, unlike the first handover mediate message, is not for obtaining information related to an alternative communication means supported by the third electronic device 300, but for delivering information related to the first alternative communication means obtained from the second electronic device 200, and the second handover mediate message may correspond to the handover put message described above in connection with FIG. 11.

Further, the third electronic device 300 may transmit a second handover select message in response to the second handover mediate message (S970).

Here, the third electronic device 300 may select one alternative communication means available in the third electronic device 300 based on the information related to the first alternative communication means included in the second handover mediate message. Further, the second handover select message may include information related to one alternative communication means selected by the third electronic device 300. However, in case there is no alternative communication means available in the third electronic device 300 or the third electronic device 300 does not desire connection of a communication link via an alternative communication means, the second handover select message might not include information related to an alternative communication means.

Further, the third electronic device 300, after transmitting the second handover select message, may send a request for initiation of a communication link to the second electronic device 200 via the selected alternative communication means (S990).

Meanwhile, the specific forms of the handover mediate message and the handover select message are to be described later.

Accordingly, even when the second electronic device 200 and the third electronic device 300 are positioned off the NFC communication range, or although positioned in the NFC communication range, have difficulty in connection via an NFC communication link due to poor mobility, they may conduct communication through an alternative communication means via the first electronic device 100 as illustrated in FIG. 14.

Figure 15:
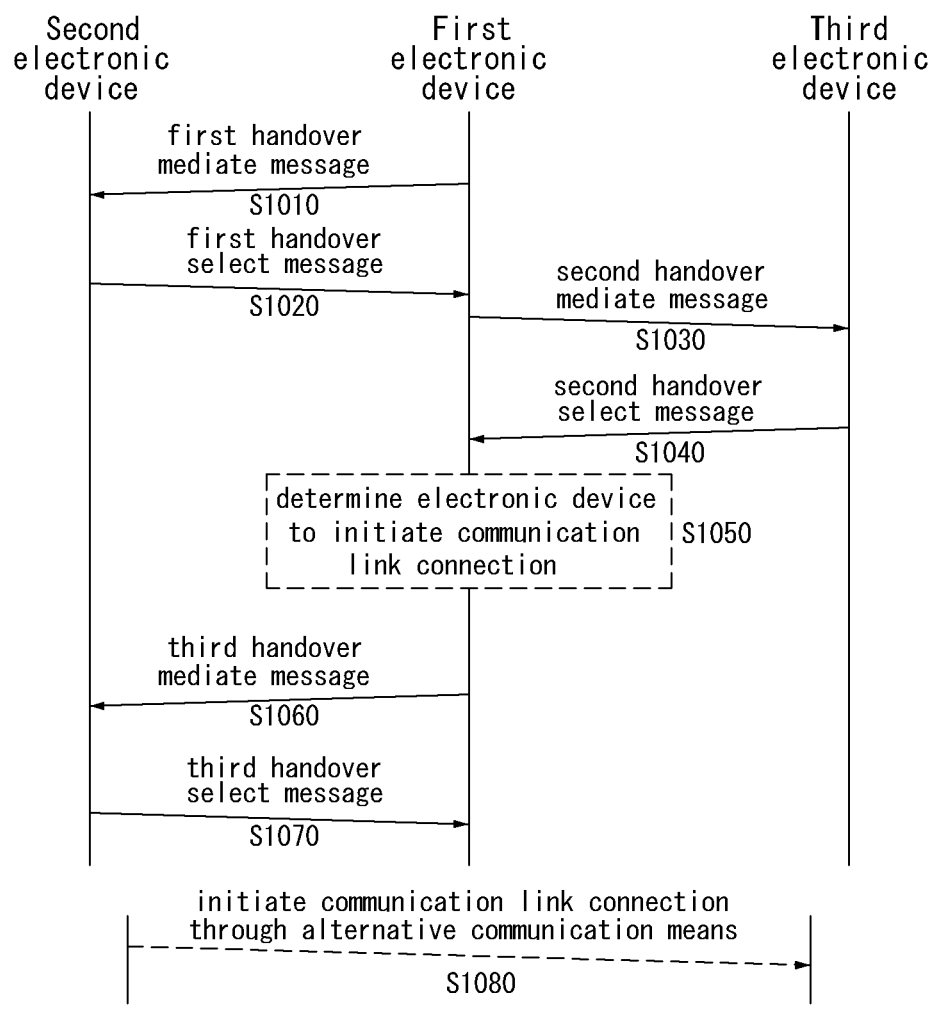
FIG. 15 is a view illustrating a handover mediation protocol according to a fifth embodiment of the present invention.

FIG. 15 is a view illustrating a handover mediation protocol according to a fifth embodiment of the present invention.

Referring to FIG. 15, the first electronic device 100 may transmit a first handover mediate message to the second electronic device 200 (S1010). Further, the second electronic device 200 may transmit a first handover select message including information related to a first alternative communication means supported by the second electronic device 200, in response to the first handover mediate message (S1020). Here, steps S1010 and S1020 may correspond to steps S910 and S930 described above in connection with FIG. 14 and thus the description thereof is skipped.

Further, the first electronic device 100 may transmit a second handover mediate message to the third electronic device 300 (S1030). The second handover mediate message, unlike the second handover mediate message as illustrated in FIG. 14, is for obtaining information related to a second alternative communication means supported by the third electronic device 300 from the third electronic device 300. Accordingly, the third electronic device may transmit a second handover select message including information related to the second alternative communication means (S1040).

Further, the first electronic device 100 may select one electronic device to initiate a communication link connection through an alternative communication means of the second electronic device 200 and the third electronic device 300

(S1050). The first electronic device 100 may arbitrarily select an electronic device to initiate a communication link connection, or may select the electronic device according to a predetermined criterion.

For example, in case the first electronic device 100 selects the second electronic device 200 as an electronic device to initiate a communication link connection, as illustrated in FIG. 15, the first electronic device 100 may transmit a third handover mediate message including information related to the second alternative communication means to the second electronic device 200 (S1060). The third handover mediate message is a message requesting that the base station 20 initiate a communication link connection and thus may correspond to the handover initiate request message described above in connection with FIG. 9(b) or the mediate put request message described above in connection with FIGS. 12 and 13 and may have the same structure as the handover initiate request message or mediate put request message.

The second electronic device 200 or the third electronic device 300 may transmit a third handover select message in response to the third handover mediate message (S1070). The third handover select message may include information on whether to agree with connection of a communication link by the alternative communication means included in the third handover mediate message. Accordingly, the third handover select message may correspond to the handover initiate request message described above in connection with FIG. 9(b) or the handover ACK/NACK message described above in connection with FIG. 11. Further, each corresponding message may have the same structure.

Meanwhile, the specific forms of the handover mediate message and the handover select message will be described later.

Further, as illustrated in FIG. 15, the second electronic device 200 may initiate connection of a communication link through one alternative communication means after transmitting the third response message (S1080).

Here, one alternative communication means may be selected by the first electronic device 100 to the third electronic device 300 or by a user as described above in connection with FIG. 9.

Accordingly, even when the second electronic device 200 and the third electronic device 300 are positioned off the NFC communication range, or although positioned within the NFC communication range, have difficulty in connection through an NFC communication link due to poor mobility, they may conduct communication by an alternative communication means via the first electronic device 100, as illustrated in FIG. 15.

Figure 16:
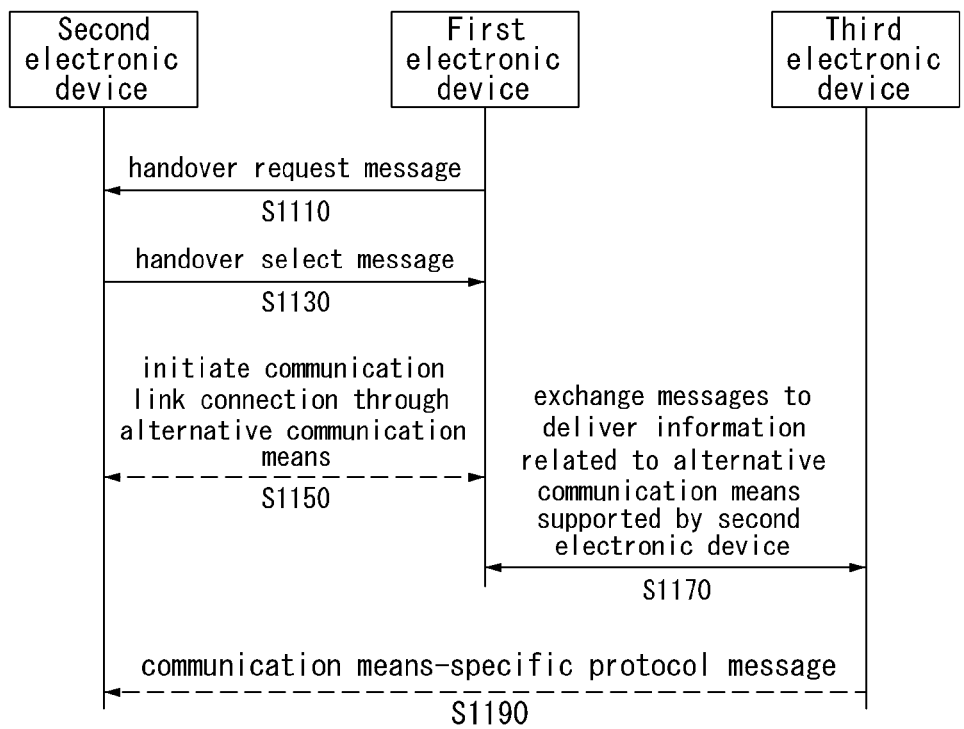
FIG. 16 is a view illustrating a handover mediation protocol according to a sixth embodiment of the present invention.

FIG. 16 is a view illustrating a handover mediation protocol according to a sixth embodiment of the present invention. Here, the same user interaction as described above in connection with FIG. 10 may be offered, of course.

Referring to FIG. 16, the first electronic device 100 may establish a communication link connection through an alternative communication means with the second electronic device 200 in order to obtain information related to an alternative communication means supported by the second electronic device 200 from the second electronic device 200 (S1150). That is, the first electronic device 100 may establish a communication link connection by a handover protocol according to an embodiment of the present invention, together with the second electronic device 200, and then may perform a handover mediation protocol through the alternative communication means formed by the handover protocol.

Accordingly, the first electronic device 100 may transmit a handover request message to the second electronic device 200 through a communication link via the alternative communication means with the second electronic device 200 (S1110), and the second electronic device 200 may transmit the handover select message in response to the handover request message (S1130). Further, steps S1170 and S1190 may correspond to steps S750 and S770 described above in connection with FIG. 11, and the detailed description thereof is skipped.

Figure 17:
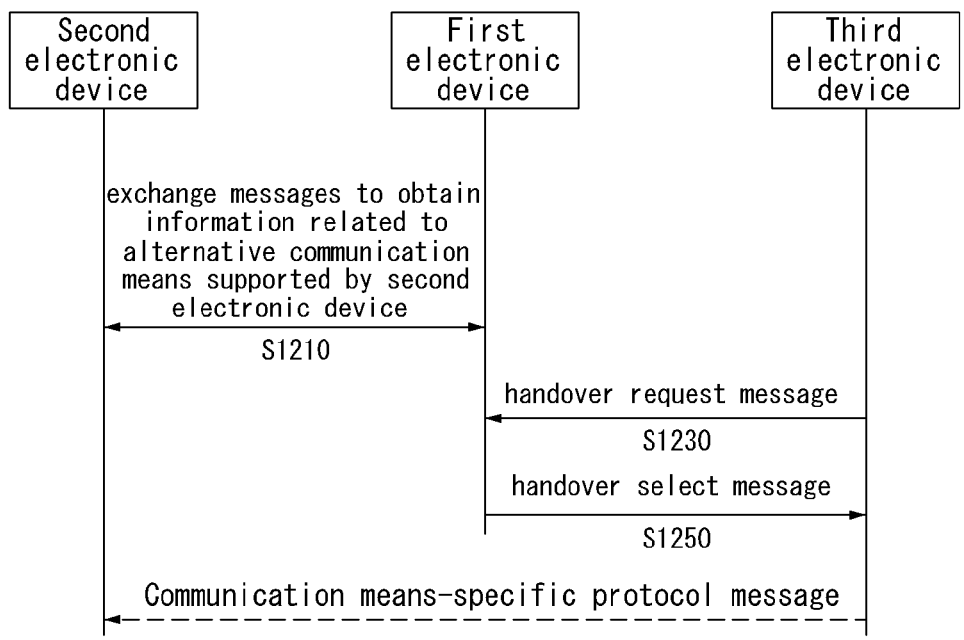
FIG. 17 is a view illustrating a handover mediation protocol according to a seventh embodiment of the present invention.

FIG. 17 is a view illustrating a handover mediation protocol according to a seventh embodiment of the present invention. Here, the same user interaction as described above in connection with FIG. 10 may be offered, of course.

Referring to FIG. 17, the first electronic device 100 may obtain information related to an alternative communication means supported by the second electronic device 200 from the second electronic device 200 (S1210). Step S1210 may correspond to step S710 of FIG. 11, and thus, the detailed description thereof is skipped.

Further, the third electronic device 300 may transmit a handover request message to the first electronic device 100 (S1230), and the first electronic device 100 may transmit a handover select message to the third electronic device 300 in response to the handover request message (S1250).

Here, the handover select message, unlike those described above in connection with FIGS. 11 to 15, may include both the information related to the first alternative communication means and the information related to the second alternative communication means supported by the second electronic device and the third electronic device.

Figure 18:
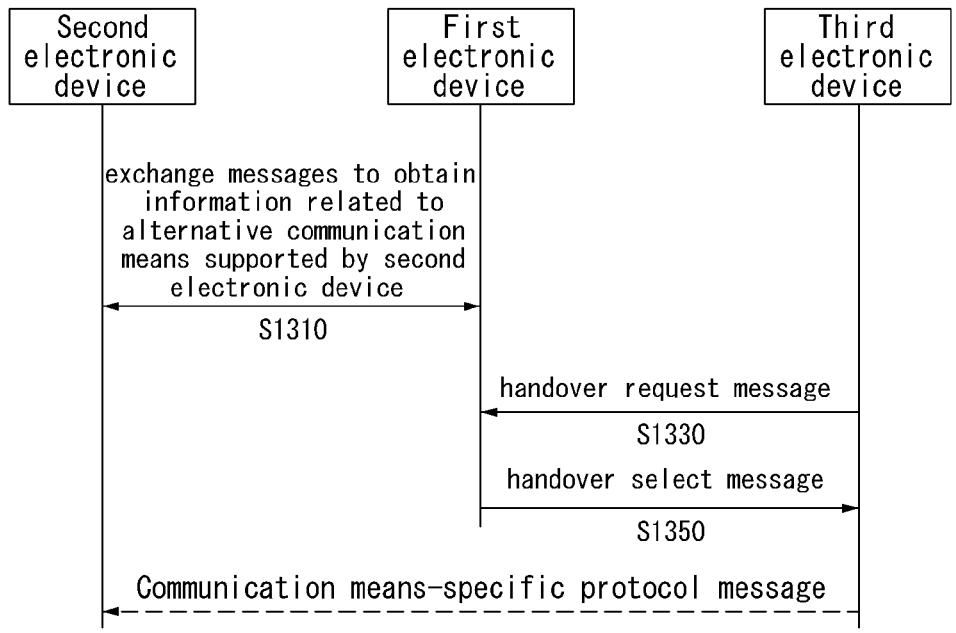
FIG. 18 is a view illustrating a handover mediation protocol according to an eighth embodiment of the present invention.

FIG. 18 is a view illustrating a handover mediation protocol according to an eighth embodiment of the present invention. Here, the same user interaction as described above in connection with FIG. 10 may be offered, of course.

Referring to FIG. 18, the first electronic device 100 may obtain information related to an alternative communication means supported by the second electronic device 200 from the second electronic device 200 (S1310). Step S1310 may correspond to step S710 of FIG. 11, and thus, the detailed description thereof is skipped.

Further, the first electronic device 100 may establish a communication link connection through an alternative communication means with the third electronic device 300 in order to obtain information related to an alternative communication means supported by the third electronic device 300 from the third electronic device 300. That is, the first electronic device 100 may establish a communication link connection by a handover protocol according to an embodiment of the present invention, together with the third electronic device 300 and then may perform a handover mediation protocol through the alternative communication means formed by the handover protocol.

Accordingly, the first electronic device 100 may transmit a handover request message to the third electronic device 300 through a communication link via the alternative communication means with the third electronic device 300 (S1330), and the third electronic device 300 may transmit a handover select message in response to the handover request message (S1350).

Accordingly, the third electronic device 300 may initiate a communication link connection by the alternative communication means by transmitting information related to the alternative communication means supported by the third electronic device 300 to the second electronic device 200.

FIGS. 19 to 23 are views illustrating a handover mediation protocol according to a ninth embodiment of the present invention.

The handover mediation protocol according to the ninth embodiment of the present invention, unlike the handover mediation protocol described above in connection with FIGS. 9 to 18, may have the second electronic device 200 or the third electronic device 300 constituted of two separate units. That is, the second electronic device 200 or the third electronic device 300 may have a tag and an NFC device that are separately provided from each other.

Hereinafter, for ease of description, it is assumed that the second electronic device 200 or the third electronic device 300 is a tag. Further, the same user interaction as described above in connection with FIG. 10 may be offered as well.

Figure 19:
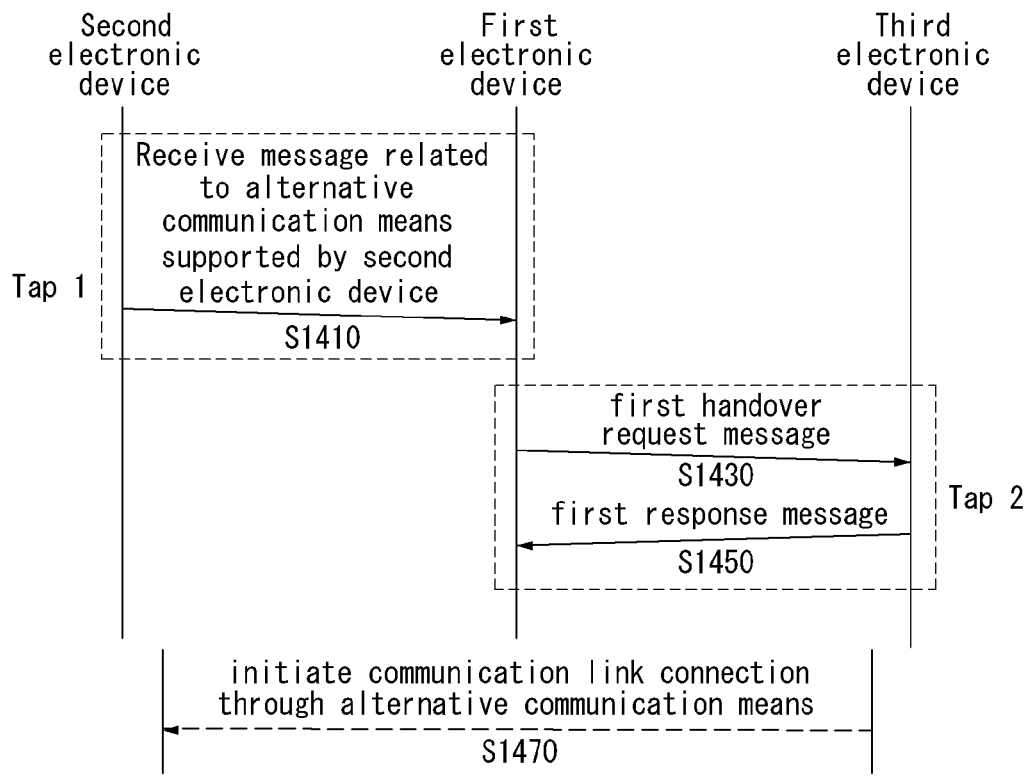
FIGS. 19 to 23 are views illustrating a handover mediation protocol according to a ninth embodiment of the present invention.

Referring to FIG. 19, the second electronic device 200 may be a tag, while the third electronic device 300 may be an NFC device.

The first electronic device 100 moves into an NFC communication range of the second electronic device 200 and may receive a message including information related to a first alternative communication means supported by the second electronic device from the second electronic device 200 by tapping or touching the second electronic device 200 (S1410). Here, the second electronic device 200 may previously store information related to the first alternative communication means. Steps S1430 to S1470 of FIG. 19 may respectively correspond to steps S650 to S690 of FIG. 9(a), and the detailed description thereof is skipped.

Figure 20:
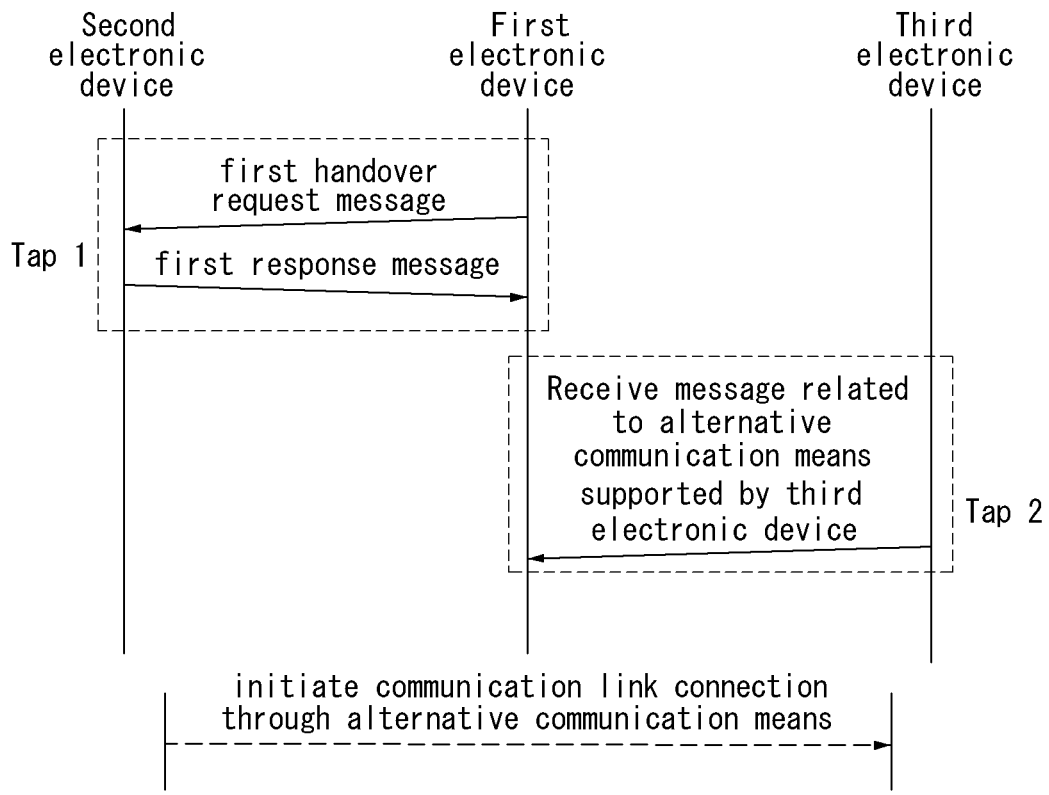

Further, referring to FIG. 20, the second electronic device 200 may be an NFC device, while the third electronic device 300 may be a tag. The handover mediation protocol described above in connection with FIG. 20 may have the same configuration as what is described above in connection with FIG. 19.

Figure 21:
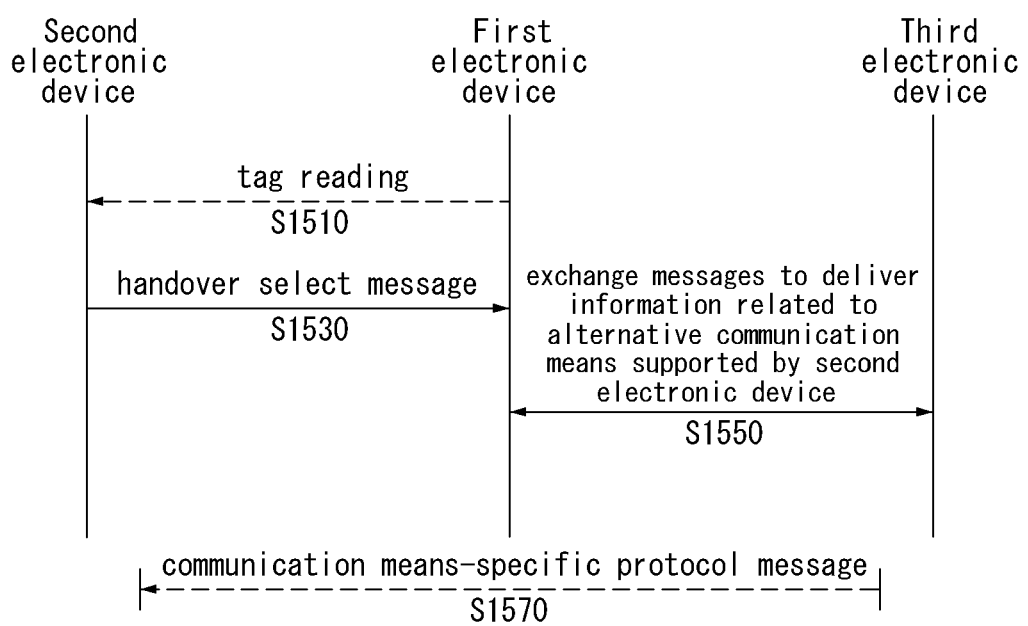

Further, referring to FIG. 21, the first electronic device 100 may relocate in the NFC communication range of the second electronic device 200 to read a tag of the second electronic device 200 (S1510) and may receive a handover select message including information related to the first alternative communication means supported by the second electronic device 200 from the second electronic device 200 (S1530). Here, the second electronic device 200 may previously store the information related to the first alternative communication means. Steps S1550 and S1570 of FIG. 21 may respectively correspond to steps S750 and S770 described above in connection with FIG. 11(b), and the detailed description thereof is skipped.

Figure 22:
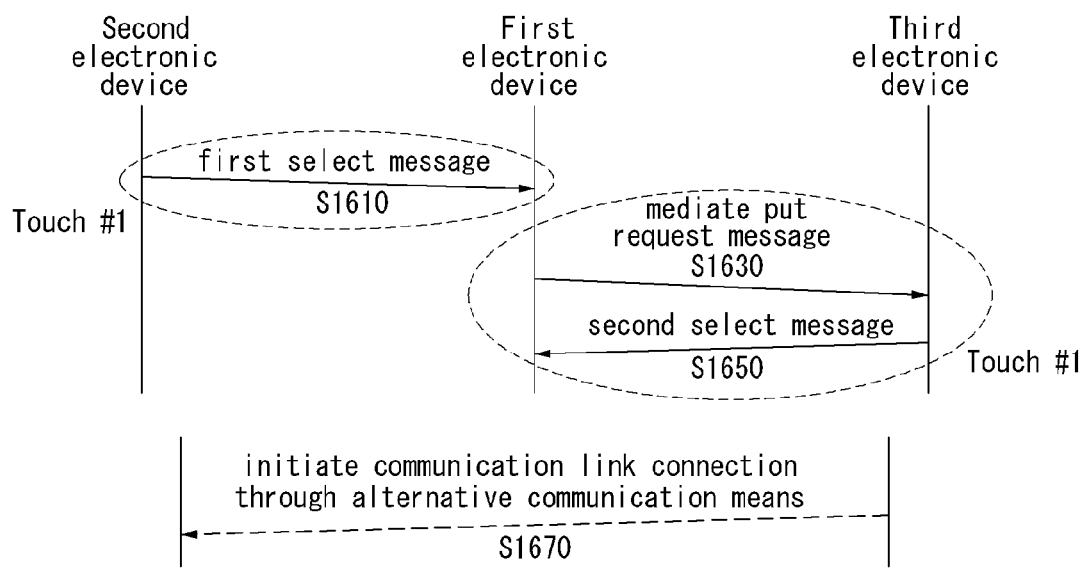

Further, referring to FIG. 22, the first electronic device 100 may move into the NFC communication range of the second electronic device 200 and may receive a first scheduled message including the information related to the first alternative communication means supported by the second electronic device 200 from the second electronic device 200 (S1610). Here, the second electronic device 200 may previously store the information related to the first alternative communication means. Steps S1630, S1650, and S1670 of FIG. 22 may respectively correspond to steps S860, S870, and S880 described above in connection with FIG. 12, and the detailed description thereof is skipped.

Figure 23:
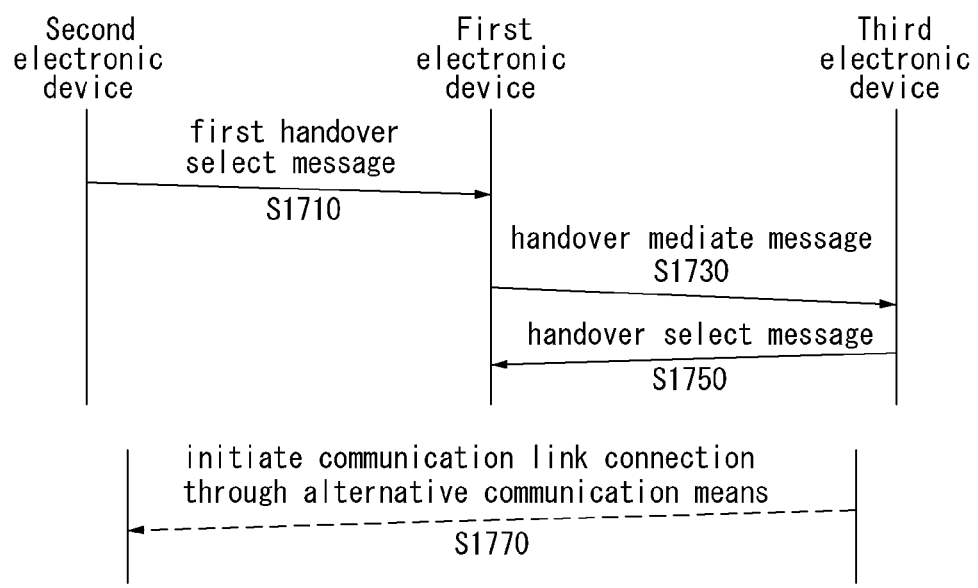

Further, referring to FIG. 23, the first electronic device 100 may move into the NFC communication range of the second electronic device 200 and may receive a first handover select message including the information related to the first alternative communication means supported by the second electronic device 200 from the second electronic device 200 (S1710). Here, the second electronic device 200 may previously sore the information related to the first alternative communication means. Steps S1730, S1750, and S1770 of FIG. 23 may respectively correspond to steps S950, S970, and S990, and the detailed description thereof is skipped.

Figure 24:
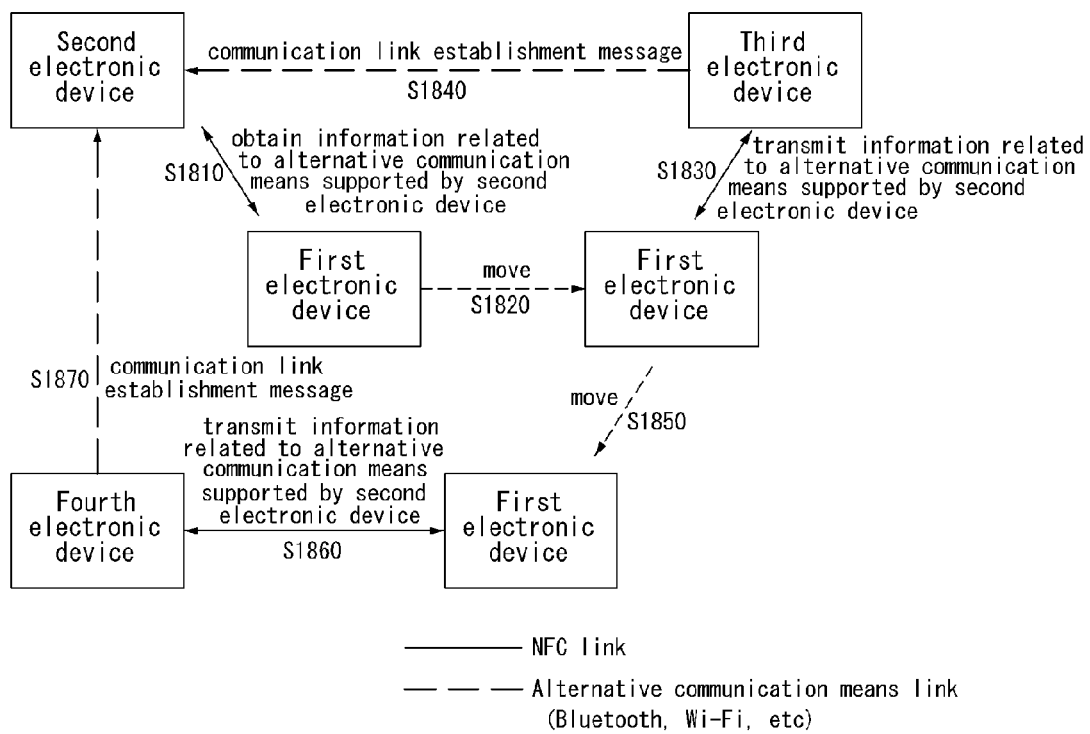
FIG. 24 is a view illustrating a handover mediation protocol according to a tenth embodiment of the present invention.

FIG. 24 is a view illustrating a handover mediation protocol according to a tenth embodiment of the present invention.

As illustrated in FIG. 24, the first electronic device 100 may perform a handover mediation protocol on a plurality of electronic devices. For example, referring to FIG. 24, the first electronic device 100 may obtain information related to an alternative communication means supported by the second electronic device 200 from the second electronic device 200 (S1810). Further, the first electronic device 100 may relocate in an NFC communication range of the third electronic device 300 (S1820) and may deliver information related to an alternative communication means supported by the third electronic device 300 to the third electronic device 300 (S1830). Accordingly, as described above in connection with step S770 of FIG. 11, the third electronic device 300 may establish a communication link by transmitting, to the second electronic device 200, a connection establishment message or communication means specific protocol message for requesting a communication link connection (S1840). Further, the first electronic device 100 may relocate an NFC communication range of a fourth electronic device (S1850) and may deliver information related to an alternative communication means supported by the second electronic device 200 to the fourth electronic device 400 (S1860). Accordingly, as described above in connection with step S770 of FIG. 11, the fourth electronic device 400 may transmit a communication link establishment message by transmitting a communication means-specific protocol message or connection establishment message for requesting a communication link connection to the second electronic device 200 (S1870).

Figure 25:
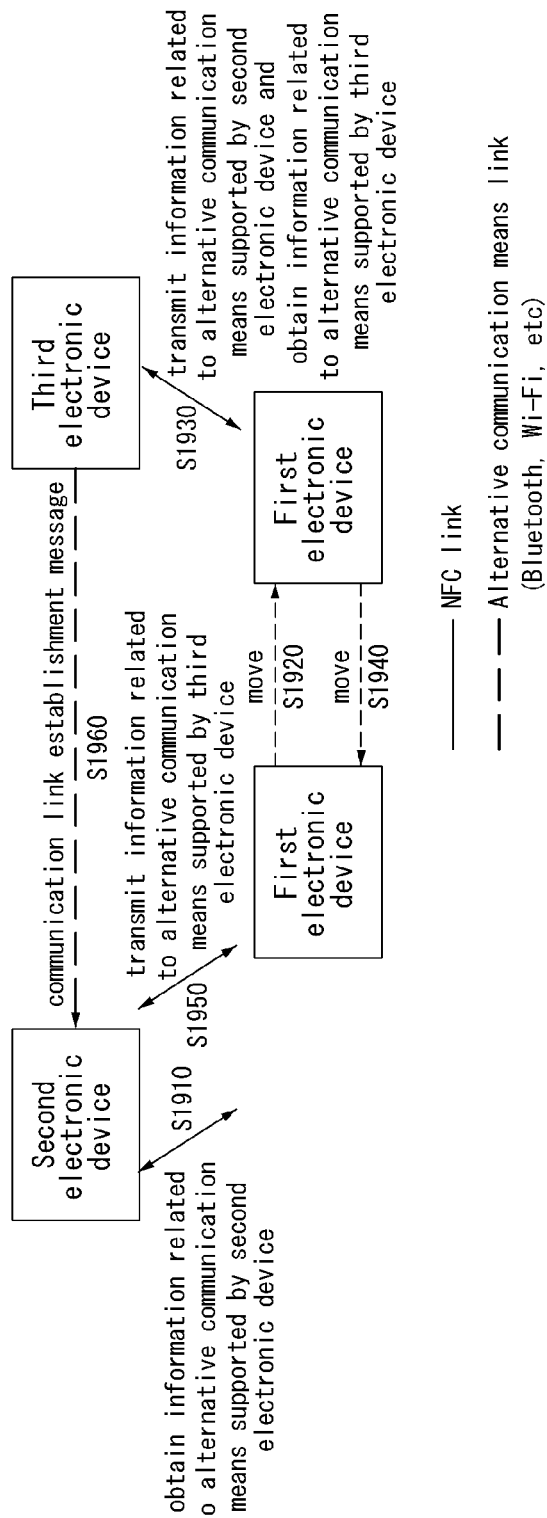
FIG. 25 is a view illustrating a handover mediation protocol according to an eleventh embodiment of the present invention.

FIG. 25 is a view illustrating a handover mediation protocol according to an eleventh embodiment of the present invention.

Referring to FIG. 25, the first electronic device 100 may obtain information related to an alternative communication means supported by the second electronic device 200 from the second electronic device 200 (S1910). Further, the first electronic device 100 may travel into an NFC communication range of the third electronic device 300 (S1920). The first electronic device 100 may deliver the information related to the alternative communication means supported by the second electronic device 200 to the third electronic device 300 and may obtain information related to an alternative communication means supported by the third electronic device 300 (S1930). Further, the first electronic device 100 may go back into the NFC communication range of the second electronic device 200 (S1940) and may deliver, to the second electronic device 200, information related to an alternative communication means supported by the third electronic device 300 (S1950). Accordingly, as described above in connection with step S770 of FIG. 11, the second electronic device 200 may transmit a communication link establishment message by transmitting a communication means-specific protocol message or connection establishment message for requesting a communication link connection to the third electronic device 300 (S1960).

Figure 26:
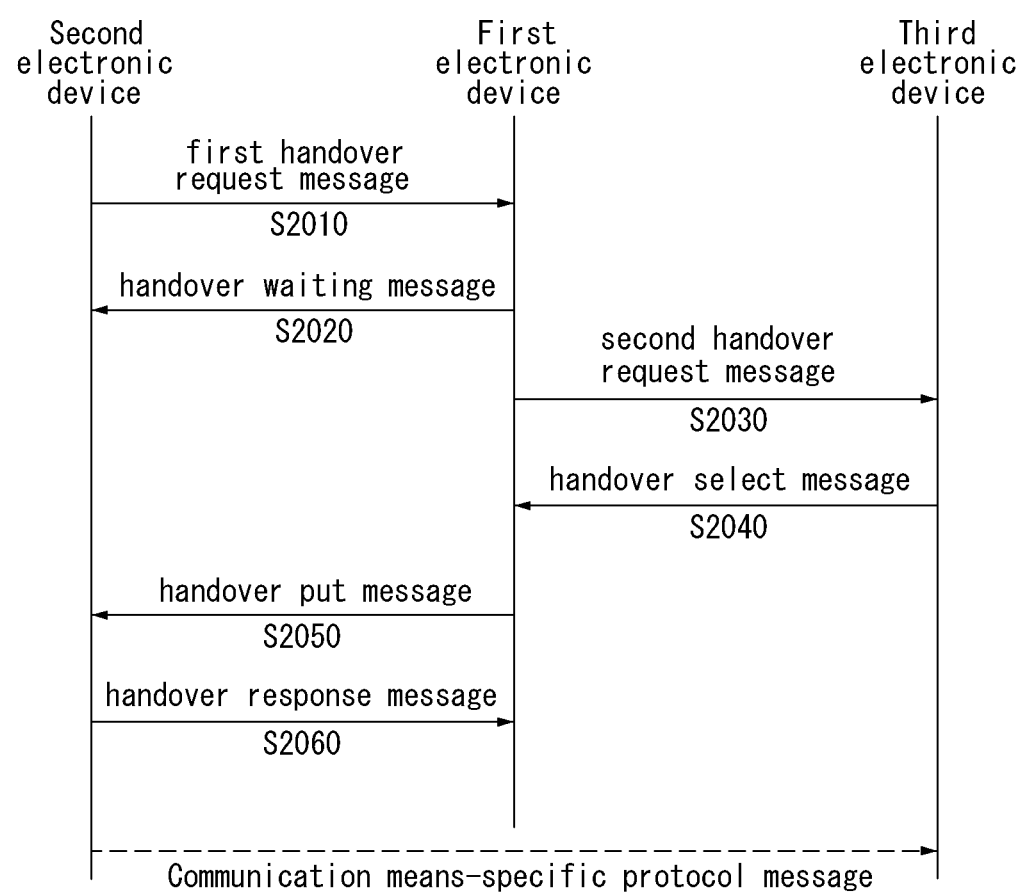
FIG. 26 is a view illustrating a handover mediation protocol according to a twelfth embodiment of the present invention.

FIG. 26 is a view illustrating a handover mediation protocol according to a twelfth embodiment of the present invention.

Referring to FIG. 26, if the second electronic device 200 transmits a first handover request message to the first electronic device 100 (S2010), then the first electronic device 100 may transmit a handover waiting message to the second electronic device 200 (S2020). Here, in case the second electronic device 200 receives the handover waiting message, the base station 20 may wait to receive a handover put message for a predetermined time.

Further, the first electronic device 100 may transmit a second handover request message to the third electronic device 300 (S2030) and may receive a handover select message from the third electronic device (S2040).

Accordingly, the first electronic device 100 may transmit the handover put message to the second electronic device 200 (S2050) and may receive a handover response message from the second electronic device 200 (S2060). The handover response message, as described above in connection with step S750 of FIG. 11, may include information on whether to agree with connection of a communication link by an alternative communication means and which electronic device is to initiate a communication link connection.

Figure 27:
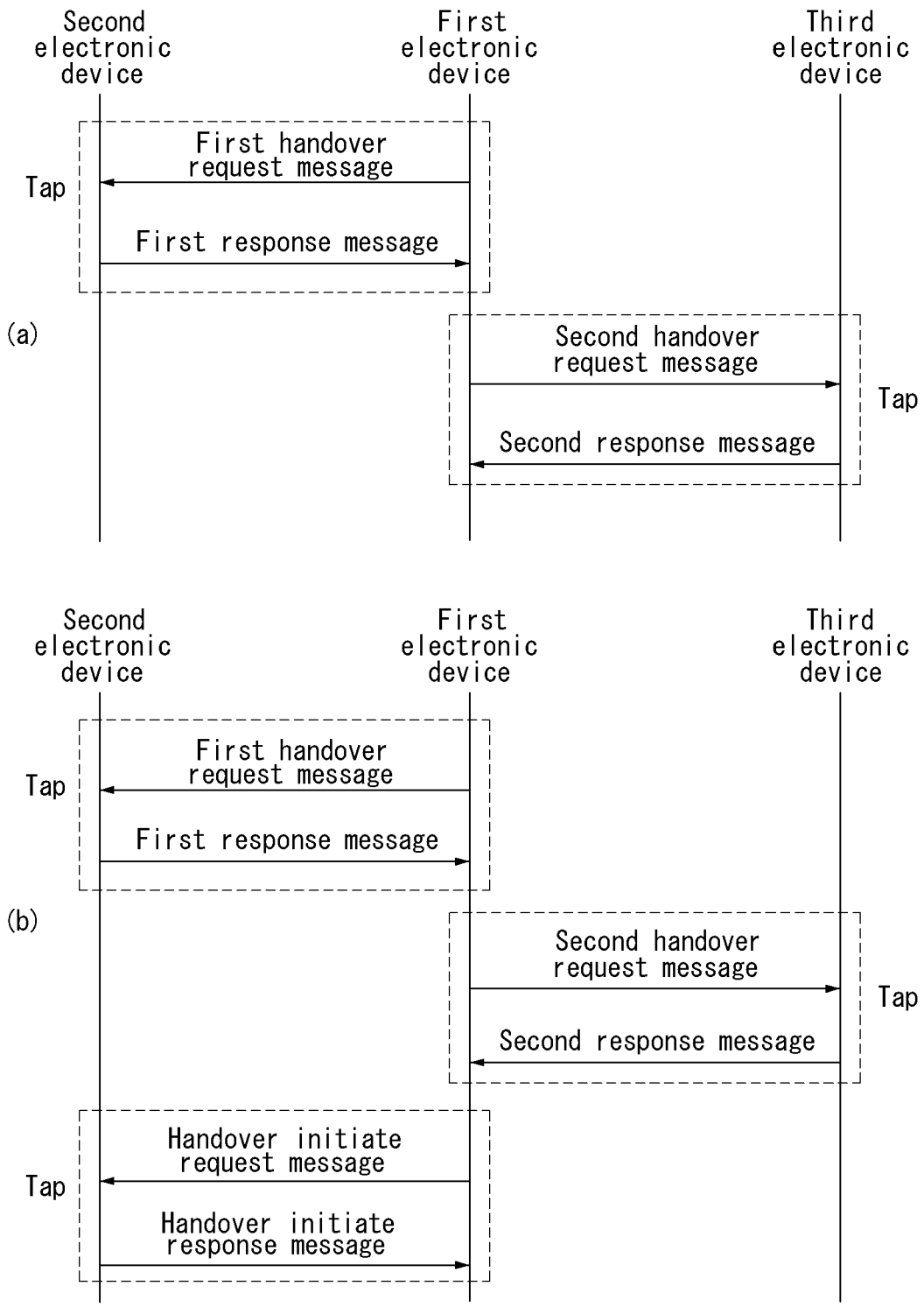
FIGS. 27 and 28 are views illustrating a handover mediation protocol according to a thirteenth embodiment of the present invention.

FIG. 27 is a view illustrating a handover mediation protocol according to a thirteenth embodiment of the present invention.

Referring to FIG. 27(*a*), the first electronic device 100 once taps, tags, or touches each of the second electronic device 200 and the third electronic device 300, so that a communication link may be established by an alternative communication means. This may be denoted 2-tap 2-tag, or 2-touch.

Figure 28:
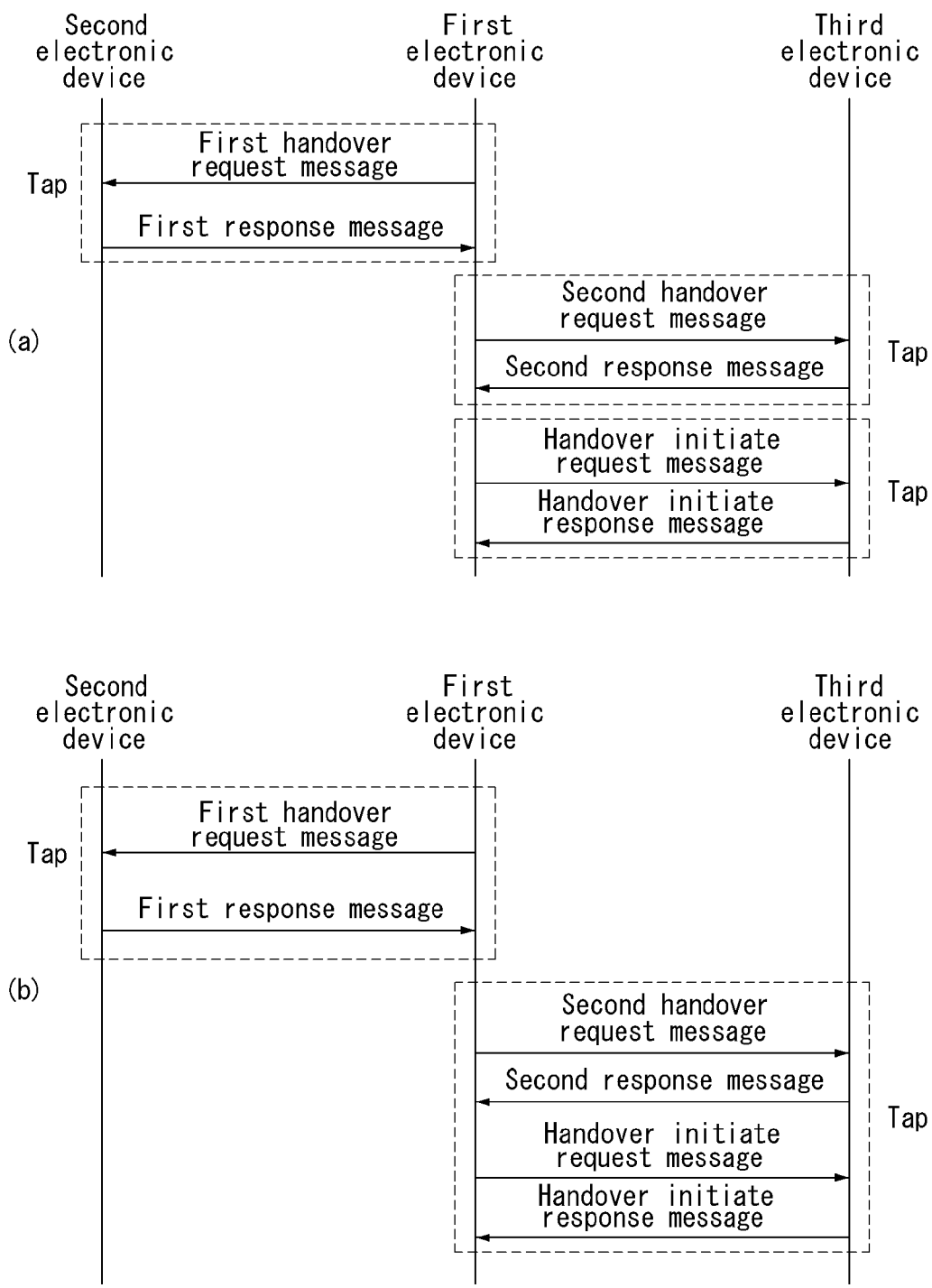

Further, referring to FIG. 27(*b*) and FIGS. 28(*a*) and (*b*), the first electronic device 100 may once tap, tag, or touch each of the second electronic device 200 and the third electronic device 300 and may then tap, tag, or touch again the second electronic device 200 or the third electronic device 300 in order to request initiation of a communication link, so that a communication link may be established by an alternative communication means. Here, as illustrated in FIG. 27(*b*), in case the first electronic device 100 transmits a request for initiation of a communication link to the second electronic device 200, the first electronic device 100 relocates from the NFC communication range of the third electronic device 300 back to the NFC communication range of the second electronic device 200, then tapping, tagging or touching, and thus, this may be denoted 3-tap, 3-tag, or 3-touch. However, as illustrated in FIG. 28(*a*), in case the first electronic device 100 transmits a request for initiation of a communication link to the third electronic device 300, if the first electronic device 100 taps, tags, or touches the third electronic device 300, this may be referred to as 3-tap, 3-tag, or 3-touch, and otherwise, as illustrated in FIG. 28(*b*), may be denoted 2-tap, 2-tag, or 2-touch.

Various embodiments of the handover mediation protocol have been described thus far, assuming that the first electronic device 100 to the third electronic device 300 all support the handover mediation protocol with reference to FIGS. 9 to 28.

Hereinafter, for ease of description, the first electronic device 100 supports a handover protocol while the second electronic device 200 or the third electronic device 300 does not support a handover mediation protocol.

For example, in case the second electronic device 200 does not support a handover mediation protocol, the second electronic device 200 may transmit a handover select message that does not include information related to an alternative communication means in response to a handover request message, handover get message, handover mediate message, or mediate get request message received from the first electronic device 100. At this time, the first electronic device 100 may be aware that the second electronic device 200 does not support a handover mediation protocol, and as illustrated in FIG. 10(*f*), may output through the output unit 150 a message indicating that the second electronic device 200 does not support a handover mediation protocol. Meanwhile, the handover request message may include identification information indicating that it is a message for initiating a handover mediation protocol. The specific structure of the message will be described later.

Accordingly, when receiving a handover select message lacking information related to an alternative communication means supported by the second electronic device 200 or the third electronic device 300 from the second electronic device 200 or the third electronic device 300, the first electronic device 100 may output through the output unit 150 of the first electronic device 100 a message indicating that the second electronic device 200 or the third electronic device 300 does not support a handover mediation protocol or a message that the second electronic device 200 or the third electronic device 300 cannot perform a handover mediation protocol. Accordingly, the first electronic device 100 may relocate into an NFC communication range of another electronic device and may order the other electronic device to execute a handover mediation protocol.

Hereinafter, data structures according to embodiments of the present invention are described in detail with reference to drawings. The data structures described below are merely examples, and the scope of the present invention is not limited thereto.

Figure 29:
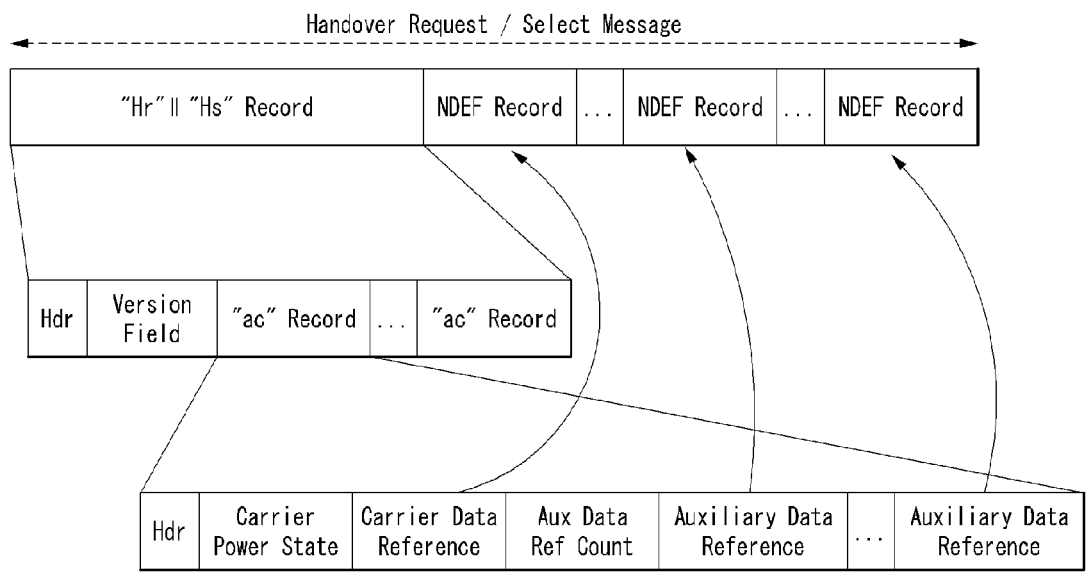
FIG. 29 is a view illustrating the general structure of a handover protocol and a handover mediation protocol according to embodiments of the present invention.

FIG. 29 is a view illustrating the general structure of a handover protocol and a handover mediation protocol message according to embodiments of the present invention. As described earlier, the messages used for a handover process and a handover mediation process may generally consist of a handover request message and a handover select message.

Further, although the "handover request message" and "handover select message" and other various corresponding terms have been used in FIGS. 9 to 28 in order to describe various embodiments of the handover mediation protocol, all of such terms are the same or similar in concept to the "handover request message" and the Handover select message" and may have the same structure as the handover request message and handover select message.

Accordingly, for ease of description, the handover request message and the handover select message are used.

Referring to the upper side of FIG. 29, the handover request message may include a handover request record (hereinafter, "Hr record") and one or more NDEF (NFC Data Exchange Format) records. Further, the handover select message (hereinafter, "Hs record") may include a handover selection record and one or more NDEF records.

The NDEF records may include specific information on an alternative communication means.

More specifically, the NDEF records included in the handover request message may have various types of information.

For example, the information included in the NDEF records may include information for identifying an alternative communication link. That is, the handover communication means record may provide the first electronic device 100 to the third electronic device 300 with information on what alternative communication means is supported by the second electronic device 200 or the third electronic device 300. As used herein, the NDEF record including the information for identifying the alternative communication link is denoted a handover carrier record.

Meanwhile, the information included in the NDEF record may include configuration information for forming an alternative communication link. As used herein, the NDEF record including the configuration information necessary for forming an alternative communication link, for example, a password or address necessary for forming a link, is denoted a carrier configuration record.

At this time, the carrier configuration record may further include information for what is the alternative communication means.

The detailed description of the handover carrier record and the carrier configuration record will be given later.

Referring to the middle part of FIG. 29, a handover request/select record according to an embodiment of the present invention may include at least one of a header (Hdr), a version field, and one or more alternative carrier records (hereinafter, "ac records"), and the alternative carrier records may define an alternative communication means requested/selected by the handover request/select message. Further, the handover request/select record may include more or fewer information fields.

Referring to the lower part of FIG. 29, the ac record according to an embodiment of the present invention may include at least one of a header (Hdr), a carrier power state, a carrier data reference, an auxiliary data reference count (Aux Data Ref Count), and one or more auxiliary data reference information fields.

The carrier data reference and the auxiliary data reference may indicate their corresponding NDEF records as illustrated in the upper part of FIG. 9.

Hereinafter, the above-mentioned pieces of information are described in greater detail with reference to FIG. 29.

Figure 30:
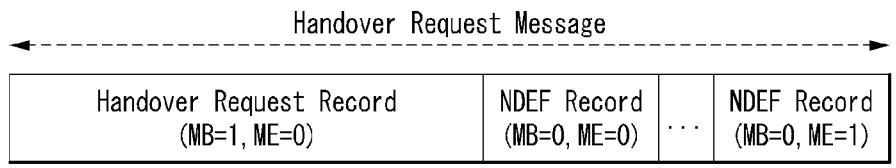
FIGS. 30 to 32 illustrate an example handover request message according to embodiments of the present invention.
Figure 31:
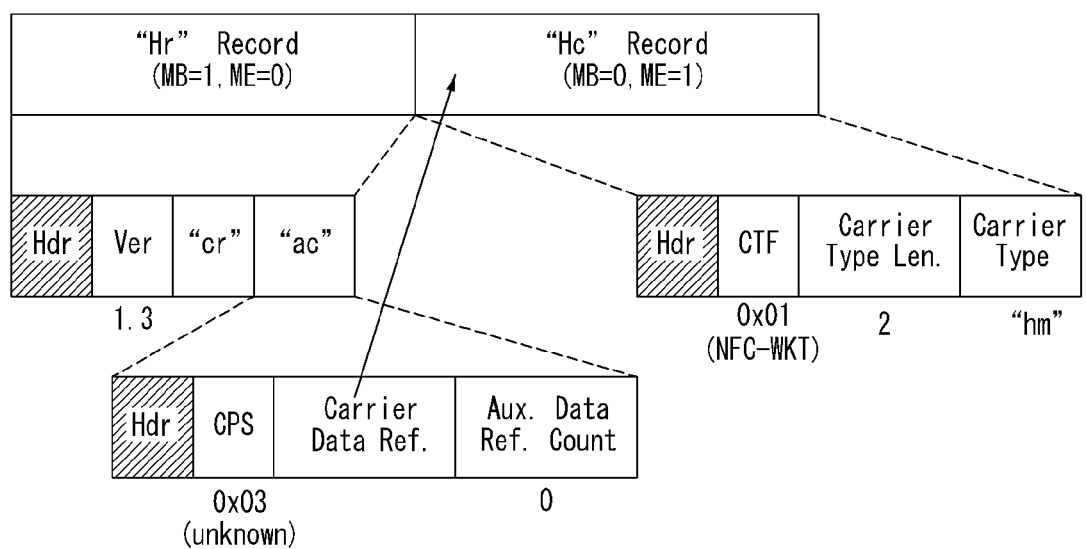
Figure 32:
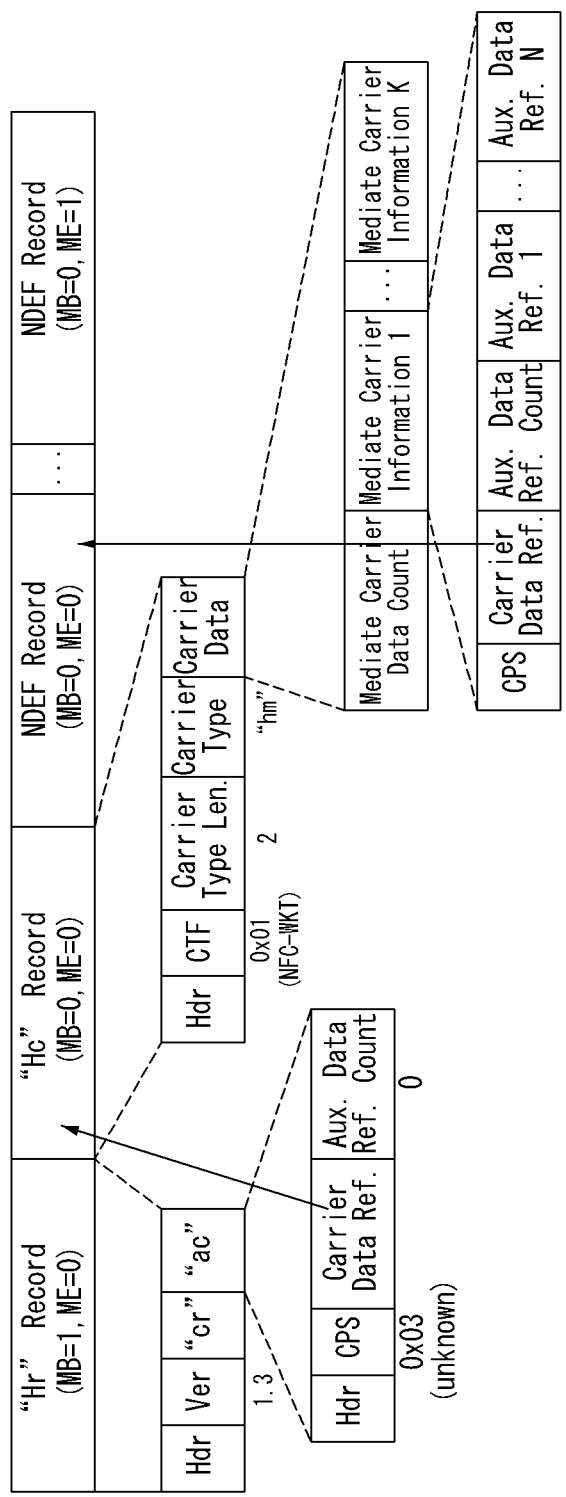

FIGS. 30 to 32 illustrate various examples of handover request messages according to embodiments of the present invention.

Referring to FIG. 30, the handover request message may be used for the first electronic device 100 to deliver information related to an alternative communication means supported by the second electronic device 200 or the third electronic device 300 to the second electronic device 200 or the third electronic device 300. Here, the handover mediator, mediate put request message, handover mediate message, and handover initiate request message described above in connection with FIGS. 9 to 23 may correspond to the handover mediate message and may have the same structure as the handover mediate message.

In such case, the handover mediate message may include a handover request record and one or more NDEF records as illustrated in FIG. 30. For example, the handover request message may start with the handover request record and end with the NDEF record. More specifically, the handover request message may start with a handover request message including a message begin (MB) flag (MB set to 1) and end with an NDEF record with a message end (ME) flag (ME set to 1). The handover request message should include at least one alternative carrier, and thus, cannot have a record in which both the MB and ME are set. The NDEF record may be one of a handover communication means record and a communication means configuration record depending on the characteristics of an alternative communication means. Further, the NDEF record may be constituted of auxiliary data. The detailed description of the NDEF record will be given later.

Further, referring to FIG. 31, the handover request message may be used for the first electronic device 100 to obtain information related to an alternative communication means supported by the second electronic device 200 or the third electronic device 300 from the second electronic device 200 or the third electronic device 300. Here, the handover get message, mediate get request message, and handover mediate message described above in connection with FIGS. 9 to 23 may correspond to the handover request message and may have the same structure as the handover request message.

In such case, the handover request message may include a handover carrier record (Hc) including information for identifying an alternative communication means without including the NDEF record having information related to an alternative communication means, as illustrated in FIG. 31. The handover carrier record may include a header (Hdr), a carrier type format (CTF), a carrier type length, and a carrier type. Here, in case the handover request message is for performing a handover mediation protocol, the carrier type may be an Hm (handover mediator). That is, the carrier type may play a role as identification information indicating start of a handover mediation protocol. The Hm is an arbitrary term, and thus it may be replaced with other terms at the preference of one of ordinary skill. Hereinafter, for ease of description, the term "Hm" is mainly used.

Further, referring to FIG. 32, the handover request message may be used to deliver information related to an alternative communication means supported by other electronic devices in the handover mediation protocol. Here, the mediate put request message described above in connection with FIG. 12 and the handover mediate message described above in connection with FIGS. 14 and 15 may correspond to the handover request message and may have the same structure as the handover request message.

In such case, the handover request message may include both a handover carrier record having a carrier type Hm and an NDEF record including information related to an alternative communication means. Accordingly, it may be represented that the mediate put request message and the handover mediate message are for the handover mediation protocol.

Figure 33:
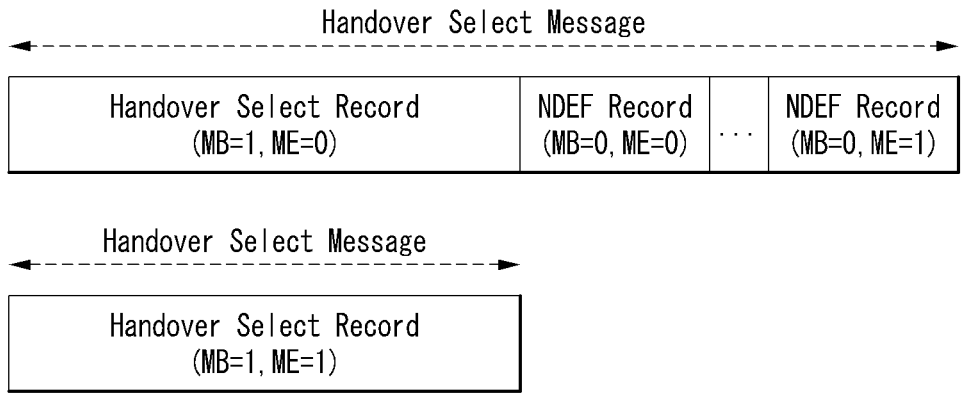
FIG. 33 illustrates an example handover select message according to an embodiment of the present invention.

FIG. 33 illustrates an example handover select message according to an embodiment of the present invention.

The handover select message may be used to provide a handover requester with information related to an alternative communication means supported by a handover selector among alternative communication means included in a handover request message received by the handover selector from the handover requester.

Further, the handover select message may be used to provide a handover mediator with information related to an alternative communication means supported by another electronic device to perform handover mediation.

Referring to the upper part of FIG. 33, the handover select message may have the same structure as the handover request message described above in connection with FIG. 28.

Further, referring to the lower part of FIG. 33, the handover select message may include a single record in which both a message begin (MB) flag and a message end (ME) flag are set to 1. That might be the situation where there is no alternative communication means supported by the handover selector among the alternative communication means supported by the handover requestor.

The response message, handover initiate request message, and select message described above in connection with FIGS. 9 to 23 may correspond to the handover select message and may have the same structure as the handover select message.

Further, since the handover ACK message is a response message agreeing with connection of a communication link and may include information on which device is to initiate a communication link connection, the handover ACK message may have both a handover ACK record and an NDEF record as illustrated in the upper part of FIG. 31. Further, since the handover NACK message is a response message disagreeing with connection of a communication link, the handover NACK message may include a handover NACK record only, without any NDEF record, as illustrated in the lower part of FIG. 31.

Hereinafter, the handover request record is described in greater detail.

Figure 34:
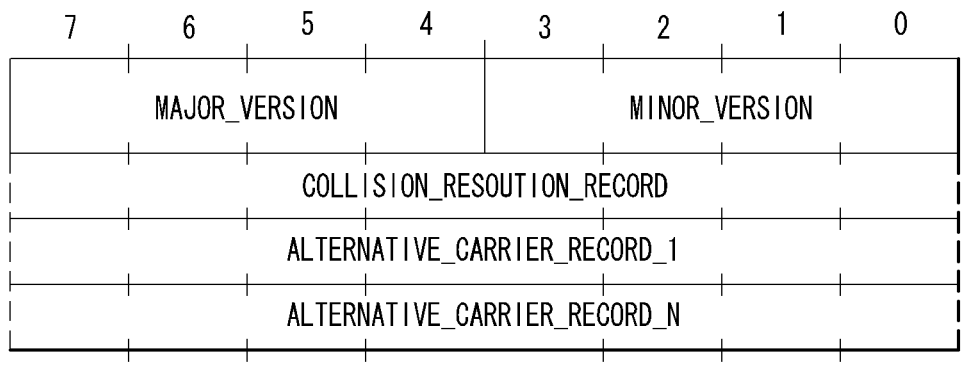
FIG. 34 illustrates an example handover request record according to an embodiment of the present invention.

FIG. 34 illustrates an example handover request record according to an embodiment of the present invention.

The handover request record may include a list of alternative communication means that may be used for the handover requestor to communicate with the handover selector.

The handover request record may indicate at least one alternative record.

Referring to FIG. 34, the handover request record may include information on at least one of a major version, a minor version, a collision resolution record, and alternative carrier records 1 to n.

Each alternative carrier record may specify an alternative communication means supported by the handover requester for communication between the handover selector and the handover requester. Information on the alternative communication means specified by each alternative carrier record may be included in the NDEF record included in the handover request message.

Hereinafter, the handover select record is described in further detail.

Figure 35:
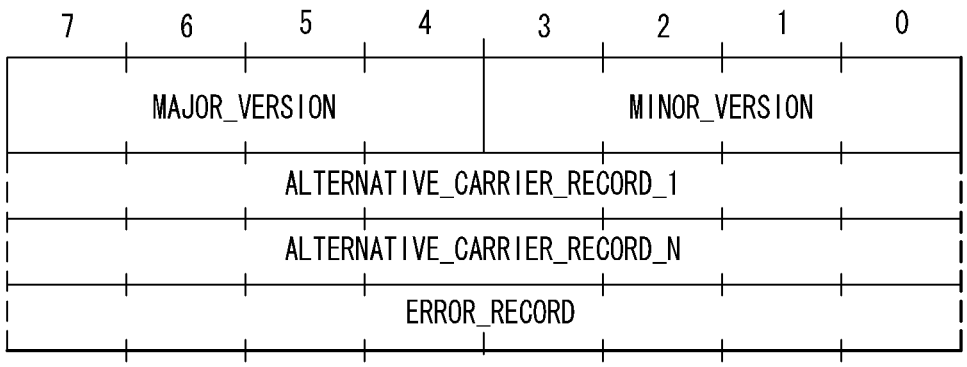
FIG. 35 illustrates an example handover select record according to an embodiment of the present invention.

FIG. 35 illustrates an example handover select record according to an embodiment of the present invention.

The handover select record is a response message responding to a handover request message received from the first electronic device 100 by the second electronic device 200 or the third electronic device 300 and may include information related to an alternative communication means supported by the second electronic device 200 or the third electronic device 300.

As illustrated in FIG. 35, the handover select record may include at least one of a major version, a minor version, information on alternative communication means records 1 to n, and information on an error.

The alternative communication means record included in the handover select record may information related to an alternative communication means jointly supported by the second electronic device 200 and/or the third electronic device 300.

Further, the order of alternative communication means included in the handover select record may indicate the priority of the alternative communication means preferred by the handover selector. For example, the alternative communication means indicated by alternative communication means record 1 may have a higher priority than the alternative communication means indicated by alternative communication means record n.

Hereinafter, a handover carrier record which is an example of the NDEF record is described in greater detail.

Figure 36:
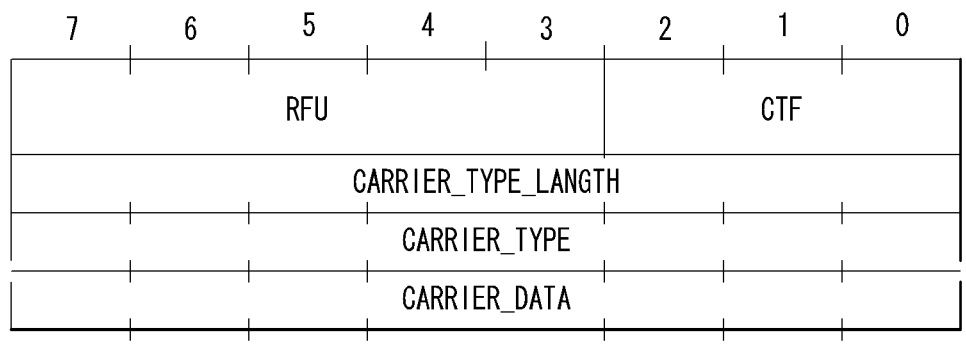
FIG. 36 illustrates an example handover carrier record according to an embodiment of the present invention.

FIG. 36 illustrates an example handover carrier record according to an embodiment of the present invention.

The handover carrier record may include information to identify an alternative communication means.

Referring to FIG. 36, the handover carrier record may include at least one of a carrier type format (hereinafter, "CTF"), a carrier type length, a carrier type, and carrier data.

The carrier type format may provide a function to indicate a value included in the carrier type that is to be described below.

For example, the carrier type format may correspond to at least one of a media type specified in NFC Forum well-known type, RFC 2046 and an absolute URI, NFC external type specified in RFC 3986.

The carrier type length may refer to the length of the carrier type that is to be described below.

The carrier type may provide a unique identifier (or unique identification) of an alternative communication means. The value of the carrier type should follow the structure, encoding, and format according to the carrier type format.

Based on at least one of the carrier type format, carrier type length, and carrier type, more specifically, based on the carrier type, what alternative communication means is to be supported by the first electronic device 100 may be verified by the second electronic device 200 or the third electronic device 300.

The carrier data may include additional information on an alternative communication means.

Meanwhile, the handover carrier record may be included in the handover request message as an NDEF record of the handover request message.

Hereinafter, the alternative carrier record (ac Record) is described in greater detail.

Figure 37:
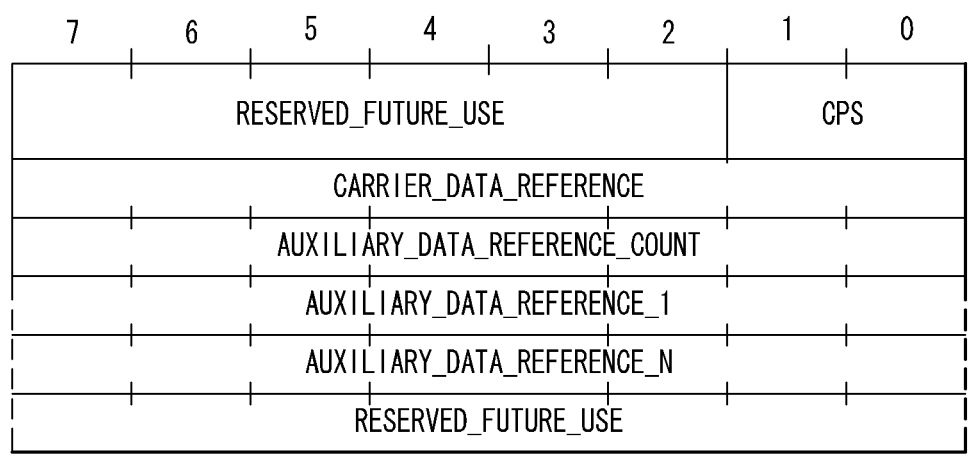
FIG. 37 illustrates an example alternative carrier record according to an embodiment of the present invention.

FIG. 37 illustrates an example alternative carrier record according to an embodiment of the present invention.

The alternative carrier record may be included in the handover request record or the handover select record.

As illustrated in FIG. 37, the alternative carrier record may include at least one of a carrier power state (CARRIER POWER STATE, i.e., CPS), a carrier data reference (CARRIER_DATA_REFERENCE), auxiliary data reference count (AUXILIARY_DATA_REFERENCE_COUNT), and auxiliary data reference 1 to n (AUXILIARY_DATA_REFERENCE 1 TO N).

The carrier power state refers to a power state of an alternative communication means. The carrier power state may be at least one of, e.g., inactive, active, activating, and unknown.

For example, in case an alternative communication means is active in its current power state, and the carrier configuration data is offered, this may indicate that the alternative communication means may be available immediately.

Further, the power state of the alternative communication means being activating may denote that an attempt to connect a communication link through the alternative communication means should be awaited. Further, in case the first electronic device 100 selects an alternative communication means whose power state is activating, the first electronic device 100 may wait for a handover response message from the second electronic device 200 or the third electronic device 300. Further, in case the second electronic device 200 or the third electronic device 300 acknowledges that the power state of the alternative communication means is activating, the second electronic device 200 or the third electronic device 300 may initiate an activating process immediately after transmitting a handover response message.

Further, for example, in case the first electronic device 100 transmits the handover request message including information related to one or more alternative communication means, the second electronic device 200 or the third electronic device 300 may transmit a handover response message declaring that the power state of the one or more alternative communication means are inactive. The first electronic device 100 may specify one alternative communication means in the handover request message, and the second electronic device 200 or the third electronic device 300 may declare that the alternative communication means is active or activating in response to the handover request message.

Further, for example, in case the second electronic device 200 or the third electronic device 300 is a tag, the second electronic device 200 or the third electronic device 300 may provide multiple inactive alternative communication means.

This may mean that a user needs to activate the communication circuits. Accordingly, the alternative communication means may remain powered-off until a specific communication means is selected among a plurality of alternative communication means, thereby saving power.

Meanwhile, the carrier data reference may provide a function to indicate the NDEF record illustrated in the upper part of FIG. 27. As described earlier, the NDEF record may be a handover carrier record or carrier configuration record.

The auxiliary data reference count may mean the number of the following auxiliary data references.

The auxiliary data reference may indicate an NDEF record that provides additional information on the alternative communication means.

The embodiments described herein may be implemented in a recording medium that may be read by a computer or a similar device using, e.g., software, hardware, or a combination thereof.

When implemented in hardware, the embodiments described herein may be realized by at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electrical units for performing the functions. In some cases, the embodiments may be implemented by the controller 180. When implemented in software, the embodiments such as procedures or functions may be realized together with a separate software module that enables at least one function or operation to be performed.

The software codes may be implemented by a software application written in a proper programming language. Further, the software codes may be stored in the memory 160 and may be executed by the controller 180.

In the above-described methods of controlling an electronic device, the steps in each embodiment are not inevitable, and each embodiment may selectively include the above-described steps. Further, each step in each embodiment is not necessarily performed in the order described, and rather, a step described later may be conducted earlier than a step described earlier.

Further, the methods of controlling an electronic device according to the present invention may be implemented in the form of codes or program performing the same, and such codes or program may be stored in a computer readable recording medium.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

INDUSTRIAL APPLICABILITY

According to the present invention, a handover mediator may deliver connection information between two or more electronic devices to its opposite device, so that a connection may be more effectively formed between the two or more electronic devices.

The invention claimed is:

1. A method for mediating a communication link by a first electronic device, the method comprising:
receiving a first handover request message from a second electronic device;
transmitting a handover waiting message to the second electronic device in response to the first handover request message, the handover waiting message including predetermined time information; and
transmitting a second handover request message to a third electronic device if the first electronic device does not receive a first handover selection message from the second electronic device during the predetermined time information,
wherein the second electronic device waits to receive a handover put message if the second electronic device receives the handover waiting message, and
wherein the handover put message indicates a message for providing a handover between the second electronic device and the third electronic device.

2. The method of claim 1, further comprising:
receiving a second handover selection message from the third electronic device in response to the second handover request message, the second handover selection message including alternative carrier information supported by the third electronic device; and
establishing a communication link for connecting the first electronic device and the third electronic device through the alternative carrier information.

3. The method of claim 2,
wherein if the alternative carrier information includes a plurality of alternative carriers, the alternative carrier information which establishes the communication link is automatically determined based on a carrier priority by the first electronic device, or is determined by a user selection via a user interface.

4. The method of claim 1,
wherein each of the first handover request message and the second handover request message includes handover carrier record which is used for identifying an alternative carrier.

5. The method of claim 4,
wherein the handover carrier record includes a carrier type format field, a carrier type length field, a carrier type field and a carrier data field.

6. A first electronic device for mediating a communication link, the first electronic device comprising:
a controller configured to:
receive a first handover request message from a second electronic device,
transmit a handover waiting message to the second electronic device in response to the first handover request message, the handover waiting message including predetermined time information, and
transmit a second handover request message to a third electronic device if the first electronic device does not receive a first handover selection message from the second electronic device during the predetermined time information,
wherein the second electronic device waits to receive a handover put message if the second electronic device receives the handover waiting message, and
wherein the handover put message indicates a message for providing a handover between the second electronic device and the third electronic device.

7. The first electronic device of claim 6,
wherein the controller is further configured to
receive a second handover selection message from the third electronic device in response to the second handover request message, the second handover selection message including alternative carrier information supported by the third electronic device, and establish a communication link for connecting the first electronic device and the third electronic device through the alternative carrier information.

8. The first electronic device of claim 7, wherein if the alternative carrier information includes a plurality of alternative carriers, the alternative carrier information which establishes the communication link is automatically determined based on a carrier priority by the first electronic device, or is determined by a user selection via a user interface.

9. The first electronic device of claim 6, wherein each of the first handover request message and the second handover request message includes handover carrier record which is used for identifying an alternative carrier.

10. The first electronic device of claim 9, wherein the handover carrier record includes a carrier type format field, a carrier type length field, a carrier type field and a carrier data field.

\* \* \* \* \*